US012586201B2

(12) United States Patent
Kang et al.

(10) Patent No.: US 12,586,201 B2
(45) Date of Patent: Mar. 24, 2026

(54) ORAL IMAGE PROCESSING DEVICE AND ORAL IMAGE PROCESSING METHOD

(71) Applicant: MEDIT CORP., Seoul (KR)

(72) Inventors: Dong Hwa Kang, Seoul (KR); Du Su Kim, Seoul (KR); Sung Hoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 465 days.

(21) Appl. No.: 18/016,719

(22) PCT Filed: Jul. 21, 2021

(86) PCT No.: PCT/KR2021/009412
§ 371 (c)(1),
(2) Date: Jan. 18, 2023

(87) PCT Pub. No.: WO2022/019647
PCT Pub. Date: Jan. 27, 2022

(65) Prior Publication Data
US 2023/0298179 A1 Sep. 21, 2023

(30) Foreign Application Priority Data

Jul. 24, 2020 (KR) ........................ 10-2020-0092554
Feb. 25, 2021 (KR) ........................ 10-2021-0025970

(51) Int. Cl.
*G06T 7/11* (2017.01)
*G06T 7/149* (2017.01)
*G06T 7/73* (2017.01)
(52) U.S. Cl.
CPC ................ *G06T 7/11* (2017.01); *G06T 7/149* (2017.01); *G06T 7/73* (2017.01); *G06T 2207/30036* (2013.01)

(58) Field of Classification Search
CPC ... G06T 7/11; G06T 7/149; G06T 7/73; G06T 2207/30036; G06T 7/75; G06T 7/0012;
(Continued)

(56) References Cited

U.S. PATENT DOCUMENTS 10,327,867 B2 6/2019 Nikolskiy et al.
10,588,714 B2 3/2020 Kim et al.
(Continued)

FOREIGN PATENT DOCUMENTS

EP 1 191 896 B1 6/2008
KR 10-2005-0082526 A 8/2005
(Continued)

OTHER PUBLICATIONS

Communication dated Jul. 4, 2022, issued in Korean Application No. 10-2021-0025970.
(Continued)

*Primary Examiner* — Matthew C Bella
*Assistant Examiner* — Andrew B. Jones
(74) *Attorney, Agent, or Firm* — Sughrue Mion, PLLC

(57) ABSTRACT

Provided are an intraoral image processing method and an intraoral image processing apparatus. The intraoral image processing method includes obtaining an intraoral image generated by scanning teeth, segmenting teeth of the intraoral image, generating a customized curve based on one or more teeth included in the intraoral image, and obtaining a final position of teeth by arranging teeth segmented from the intraoral image to be aligned with the customized curve.

14 Claims, 22 Drawing Sheets

(58) Field of Classification Search
CPC ... G06T 2207/20084; A61C 7/00; A61C 9/00; G16H 50/50
See application file for complete search history.

(56) References Cited

U.S. PATENT DOCUMENTS

| | | | |
|---|---|---|---|
| 11,051,912 B2 | 7/2021 | Martz et al. | |
| 11,432,909 B2 | 9/2022 | Lee et al. | |
| 2005/0043837 A1* | 2/2005 | Rubbert | A61C 7/00 |
| | | | 700/118 |
| 2020/0113649 A1* | 4/2020 | Lee | A61C 7/002 |

FOREIGN PATENT DOCUMENTS

| | | | |
|---|---|---|---|
| KR | 10-1138355 B1 | 4/2012 | |
| KR | 10-1218390 B1 | 1/2013 | |
| KR | 10-2016-0103948 A | 9/2016 | |
| KR | 10-2018-0017452 A | 2/2018 | |
| KR | 10-1829409 B1 | 2/2018 | |
| KR | 10-2019-0140990 A | 12/2019 | |
| KR | 10-2097070 B1 | 4/2020 | |
| KR | 10-2123660 B1 | 6/2020 | |
| KR | 10-2125813 B1 | 6/2020 | |
| WO | 2020/017824 A1 | 1/2020 | |

OTHER PUBLICATIONS

Joo Hwan CHO et al., "A Study of Dental Arch Form in Normal Occlusion", Department of Orthodontics, College of Dentistry, 1984, vol. 14, No. 2, pp. 249-261 (13 pages).

Request for the Submission of an Opinion of Korean Application No. 10-2021-0025970 dated Oct. 25, 2022.

International Search Report of PCT/KR2021/009412 dated Oct. 26, 2021 [PCT/ISA/210].

Communication dated May 26, 2023, issued in Korean Application No. 10-2021-0025970.

* cited by examiner

TEETH (220)    GUMS (240)

INTRAORAL IMAGE (200)            TOOTH IMAGE IN INTRAORAL IMAGE (260)

CUSTOMIZED CURVE(400)

CURVE BASED ON INTRAORAL IMAGE

CURVE BASED ON INTRAORAL IMAGE

ALIGN TEETH WITH CUSTOMIZED CURVE

TEETH ALIGNED WITH CUSTOMIZED CURVE (930)

TEETH ALIGNED WITH TOOTH MODEL DATA (920)

CUSTOMIZED CURVE (400)

1600B

1600A

ORAL IMAGE PROCESSING DEVICE AND ORAL IMAGE PROCESSING METHOD

TECHNICAL FIELD

Described embodiments relate to an intraoral image processing apparatus and an intraoral image processing method.

Particularly, embodiments described herein relate to an intraoral image processing apparatus and an intraoral image processing method for obtaining a final position of teeth for an orthodontic plan.

BACKGROUND ART

There are various fields in the dental treatment of patients. An orthodontic treatment (or a tooth adjustment) may be an example of the dental treatment.

In order to perform an orthodontic treatment, an orthodontic device such as brackets may be installed on the patient's teeth and a wire may be connected to at least one installed bracket. The position of teeth may be adjusted by moving at least one tooth to a desired position, that is, a final position or a target positions of the teeth, by using the brackets connected to the wire.

Because an orthodontic treatment is performed by moving teeth at an initial position in the patient's teeth to a desired target position, it may be important in an orthodontic plan to accurately determine a final tooth position or a target tooth position indicating to which position the teeth at the initial position are to be moved.

DISCLOSURE

Technical Problem

Embodiments described herein provide an intraoral image processing method for obtaining a final position to which teeth are to be moved in an orthodontic plan, an apparatus for performing an operation according thereto, and a computer-readable storage medium having stored therein a program for performing the intraoral image processing method.

Technical Solution

According to an embodiment, provided are an intraoral image processing method and an intraoral image processing apparatus, the intraoral image processing method including obtaining an intraoral image generated by scanning teeth, segmenting teeth of the intraoral image, generating a customized curve based on one or more teeth included in the intraoral image, and obtaining a final position of teeth by arranging teeth segmented from the intraoral image to be aligned with the customized curve.

Advantageous Effects

According to embodiments described herein, an intraoral image processing method, an apparatus for performing an operation according thereto, and a computer-readable storage medium having stored therein a program for performing the intraoral image processing method may obtain a final tooth position more suitable for the patient's teeth arrangement state by obtaining a final tooth position to which teeth are to be moved based on the patient's teeth in an orthodontic plan.

DESCRIPTION OF DRAWINGS

The present disclosure may be easily understood through the following detailed description and the accompanying drawings, in which reference numerals refer to structural elements.

BEST MODE

Figure 1:
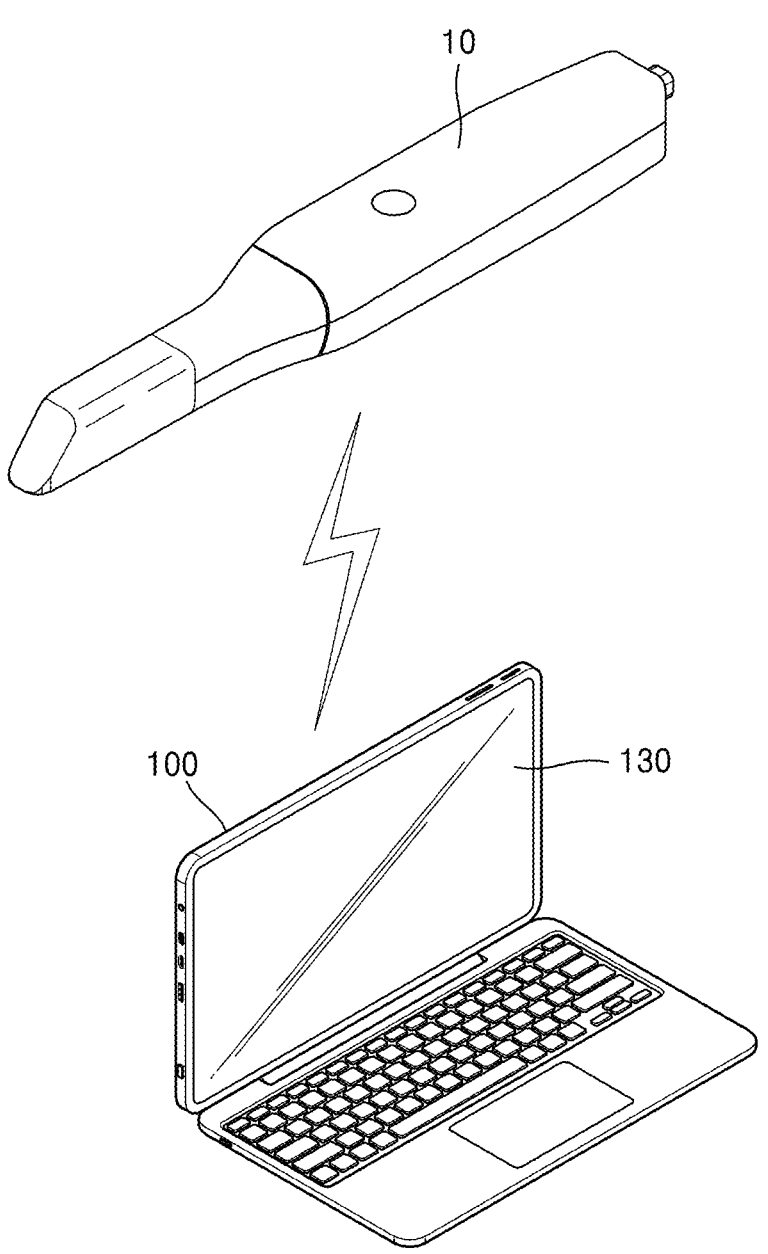
FIG. 1 is a diagram for describing an intraoral image processing system according to embodiments.

According to an embodiment, a method of processing an intraoral image includes obtaining an intraoral image generated by scanning teeth, segmenting teeth of the intraoral image, generating a customized curve based on one or more teeth included in the intraoral image, and obtaining a final position of teeth by arranging teeth segmented from the intraoral image to be aligned with the customized curve.

According to an embodiment, the segmenting of the teeth of the intraoral image may include separating the teeth of the intraoral image by using information of teeth included in tooth model data, and obtaining at least one piece of shape information, position information, and number information of each of the separated teeth.

According to an embodiment, the generating of the customized curve based on the one or more teeth included in the intraoral image may include determining a predefined number of reference teeth among the teeth included in the intraoral image according to a predetermined reference, and generating the customized curve based on features of the predefined number of determined reference teeth.

According to an embodiment, the features of the reference teeth may include at least one of an outermost point, an uppermost point, or a buccal point of the reference teeth.

According to an embodiment, the generating of the customized curve based on the features of the reference teeth may include adjusting positions of one or more reference teeth among the reference teeth, and generating the customized curve based on the features of the reference teeth including the position-adjusted one or more reference teeth.

According to an embodiment, the adjusting of the positions of the one or more reference teeth among the reference teeth may include moving the position of the reference tooth such that an angle formed between the reference tooth and teeth adjacent to the reference tooth may be equal to or greater than a certain angle.

According to an embodiment, the adjusting of the positions of the one or more reference teeth among the reference teeth may include, when the customized curve generated based on the reference teeth has a concave portion, moving the positions of the reference teeth corresponding to the concave portion.

According to an embodiment, the adjusting of the positions of the one or more reference teeth among the reference teeth may include moving a position of two front teeth such that two teeth corresponding to front teeth among the reference teeth are located in parallel.

According to an embodiment, the obtaining of the final positions of the teeth by arranging the teeth segmented from the intraoral image to be aligned with the customized curve may include aligning the teeth segmented from the intraoral image based on tooth model data, and moving the teeth aligned based on the tooth model data to be aligned with the customized curve.

According to an embodiment, the aligning of the teeth segmented from the intraoral image based on the tooth model data may include rotating the teeth segmented from the intraoral image with reference to directions of teeth of the tooth model data.

According to an embodiment, the customized curve may include an upper-jaw customized curve, and the method may further include generating a lower-jaw customized curve by moving the upper-jaw customized curve by a predetermined distance, and arranging the teeth segmented from the intraoral image to be aligned with the upper-jaw customized curve and the lower-jaw customized curve.

According to an embodiment, the method may further include adjusting positions of the upper-jaw customized curve and the lower-jaw customized curve by moving at least one of the upper-jaw customized curve and the lower-jaw customized curve by a certain offset in a Y-axis direction.

According to an embodiment, an apparatus for processing an intraoral image includes a memory, and a processor configured to execute one or more instructions stored in the memory to obtain an intraoral image generated by scanning teeth, segment teeth of the intraoral image, generate a customized curve based on one or more teeth included in the intraoral image, and obtain a final position of teeth by arranging teeth segmented from the intraoral image to be aligned with the customized curve.

According to embodiments, a non-transitory computer-readable storage medium having recorded thereon a program including at least one instruction to perform an intraoral image processing method, the intraoral image processing method including obtaining an intraoral image generated by scanning teeth, segmenting teeth of the intraoral image, generating a customized curve based on one or more teeth included in the intraoral image, and obtaining a final position of teeth by arranging teeth segmented from the intraoral image to be aligned with the customized curve.

MODE FOR INVENTION

The specification clarifies the scope of the present disclosure and describes the principle of the present disclosure and embodiments thereof such that those of ordinary skill in the art of the present disclosure may implement the present disclosure. The described embodiments may be implemented in various forms.

Throughout the specification, like reference numerals may denote like elements. The specification may not describe all elements of the embodiments, and redundant contents between the embodiments or general contents in the art of the present disclosure will be omitted for conciseness. The term "unit (part or portion)" used herein may be implemented as software or hardware, and according to embodiments, a plurality of "units" may be implemented as one element, or one "unit" may include a plurality of elements. Hereinafter, the operation principle and embodiments of the present disclosure will be described with reference to the accompanying drawings.

Herein, an image may include an image representing at least one tooth or an oral cavity including at least one tooth (hereinafter referred to as "intraoral image").

Also, herein, the image may be a two-dimensional (2D) image of an object or a three-dimensional (3D) model or a 3D image three-dimensionally representing an object. Also, herein, the image may refer to data required to represent an object in 2D or 3D, for example, raw data obtained from at least one image sensor. Particularly, the raw data may be data obtained to generate an intraoral image, and when the inside of the oral cavity of a patient as an object is scanned by using an intraoral scanner, the raw data may be data (e.g., 2D data) obtained from at least one image sensor included in the intraoral scanner.

Herein, the "object" may include teeth, gums, at least some areas of the oral cavity, and/or an artificial structure insertable into the oral cavity (e.g., an orthodontic device, implants, artificial teeth, or an orthodontic assistance tool inserted into the oral cavity). Here, the orthodontic device may include at least one of brackets, attachments, orthodontic screws, a lingual orthodontic device, and a removable orthodontic retainer.

Hereinafter, embodiments will be described in detail with reference to the accompanying drawings.

FIG. 1 is a diagram for describing an intraoral image processing system according to embodiments.

Referring to FIG. 1, an intraoral scanner 10 may be a medical device for obtaining an intraoral image.

Particularly, the intraoral scanner 10 may be a device for obtaining an image of the oral cavity including at least one tooth by scanning teeth in a non-contact manner by being inserted into the oral cavity. Also, the intraoral scanner 10 may have a form capable of being drawn into and from the oral cavity and may scan the inside of the patient's oral cavity by using at least one image sensor (e.g., an optical camera). In order to image the surface of at least one of teeth, gums, and an artificial structure insertable into the oral cavity as an object (e.g., an orthodontic device including brackets and wires, implants, artificial teeth, or an orthodontic assistance tool inserted into the oral cavity), the intraoral scanner 10 may obtain surface information of the object as raw data.

Image data obtained by the intraoral scanner 10 may be transmitted to a data processing apparatus 100 connected through a wired or wireless communication network.

The data processing apparatus 100 may any electronic device that may be connected to the intraoral scanner 10 through a wired or wireless communication network, may receive a 2D image obtained by scanning the oral cavity from the intraoral scanner 10, and may generate, process, display, and/or transmit an intraoral image based on the received 2D image.

Based on 2D image data received from the intraoral scanner 10, the data processing apparatus 100 may generate at least one piece of information generated by processing the 2D image data and an intraoral image generated by processing the 2D image data and display the generated information and the generated intraoral image through a display 130.

The data processing apparatus 100 may be, but is not limited to, a computing device such as a smartphone, a laptop computer, a desktop computer, a PDA, or a tablet PC.

Also, the data processing apparatus 100 may be provided in the form of, for example, a server (or a server device) for processing an intraoral image.

Also, the intraoral scanner 10 may transmit raw data obtained through intraoral scanning to the data processing apparatus 100 as it is. In this case, based on the received raw data, the data processing apparatus 100 may generate a 3D intraoral image three-dimensionally representing the oral cavity. Also, because the "3D intraoral image" may be generated by three-dimensionally modeling the internal structure of the oral cavity based on the received raw data, it may be referred to as a "3D intraoral model" or a "3D intraoral image". Hereinafter, a model or an image representing the oral cavity in 2D or 3D will be collectively referred to as an "intraoral image".

Also, the data processing apparatus 100 may analyze, process, display, and/or transmit the generated intraoral image to an external device.

As another example, the intraoral scanner 10 may obtain raw data through intraoral scanning, process the obtained raw data, generate an image corresponding to the oral cavity as an object, and transmit the image to the data processing apparatus 100. In this case, the data processing apparatus 100 may analyze, process, display, and/or transmit the received image.

In embodiments, the data processing apparatus 100 may be an electronic device that may generate and display an intraoral image three-dimensionally representing the oral cavity including one or more teeth, which will be described below in detail.

Figure 2:
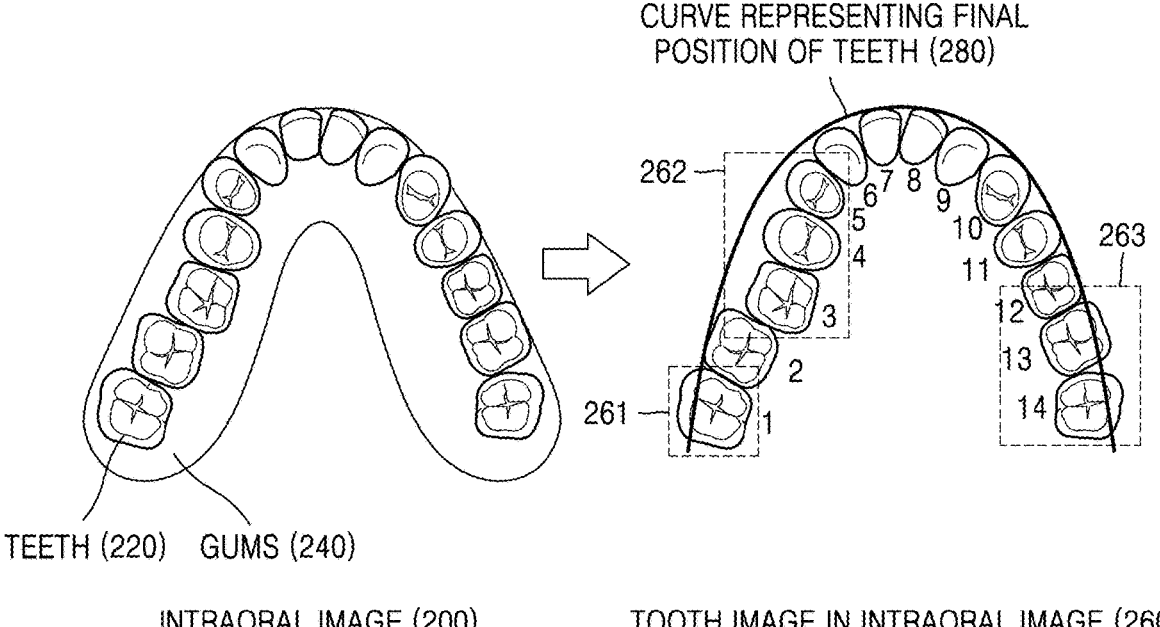
FIG. 2 is a reference diagram for describing a final position for adjustment of teeth included in an intraoral image, according to an example.

FIG. 2 is a reference diagram for describing a final position for adjustment of teeth included in an intraoral image, according to an example.

For example, the patient's teeth may be scanned by using the intraoral scanner 10 described in FIG. 1. The data processing apparatus 100 may generate an intraoral image 200 including one or more teeth, based on the data obtained by the intraoral scanner 10.

The intraoral scanner 10 may obtain 2D data representing surface information of an object. The data processing apparatus 100 may generate an intraoral image 200 based on the 2D data obtained by the intraoral scanner 10.

As for the intraoral image 200, because the entire surface inside the patient's oral cavity is imaged, one or more teeth 220 and gums 240 surrounding the teeth may be imaged all together.

Because a target tooth arrangement state is obtained through the position movement or rotation movement of teeth according to an orthodontic plan, one or more teeth among the teeth of an tooth area 260 in the intraoral image 200 may be moved based on a curve 280 representing a final tooth position.

Referring to FIG. 2, comparing the curve 280 representing the final tooth position with the arrangement state of the tooth area 260, the teeth of a tooth area 261 corresponding to tooth number #1 and a tooth area 263 corresponding to tooth numbers #13 and #14 may require an adjustment for movement to the inside of the curve 280 and the teeth of a tooth area 262 corresponding to tooth numbers #3, #4, and #5 may require an adjustment for movement from inside to outside toward the curve.

Because the final positions of the teeth after being adjusted according to the orthodontic plan depends on the curve 280 representing the tooth final position, it may be important for an successful orthodontic plan to determine a reference for determining the curve and how to arrange the final positions of the teeth according to the curve.

Figure 3:
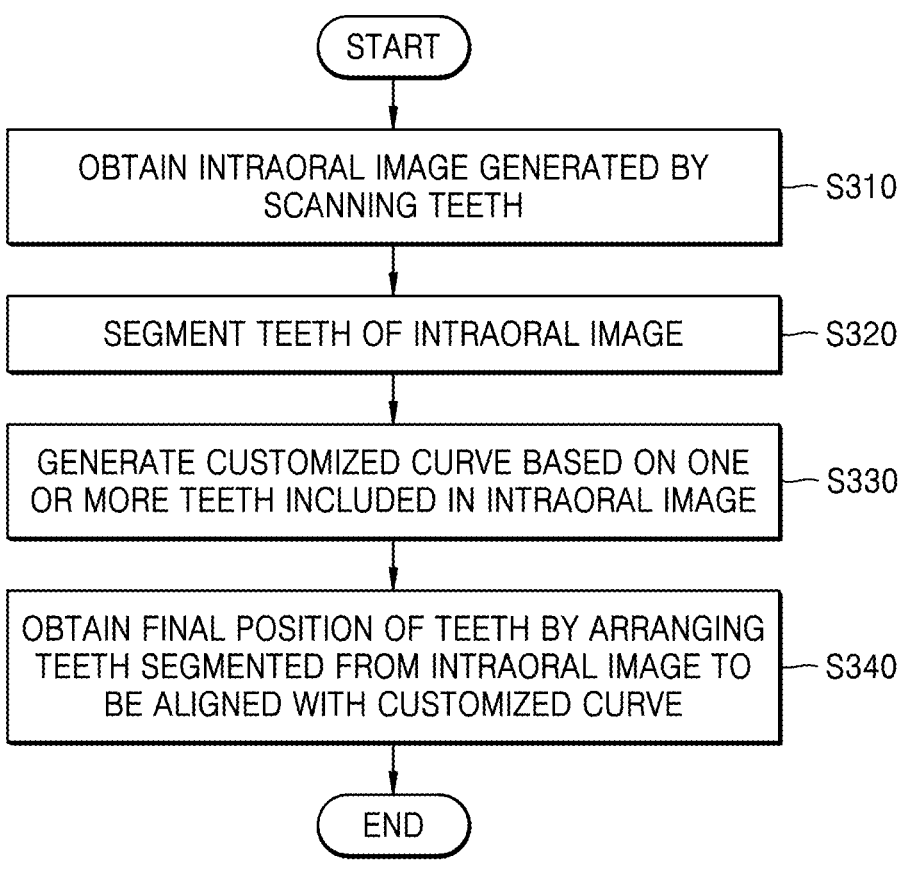
FIG. 3 is a flowchart illustrating an intraoral image processing method of a data processing apparatus according to embodiments.

FIG. 3 is a flowchart illustrating an intraoral image processing method of a data processing apparatus according to embodiments.

Referring to FIG. 3, in operation 310, the data processing apparatus 100 may obtain an intraoral image generated by scanning teeth.

According to an embodiment, the data processing apparatus 100 may receive 2D data generated by scanning teeth from the oral scanner 10 illustrated in FIG. 1 and generate an intraoral image based on the received 2D data.

According to an embodiment, the data processing apparatus 100 may receive, from the intraoral scanner 10, an intraoral image generated based on 2D data obtained by scanning the teeth.

According to an embodiment, the data processing apparatus 100 may obtain an intraoral image stored in a memory.

Figure 4:
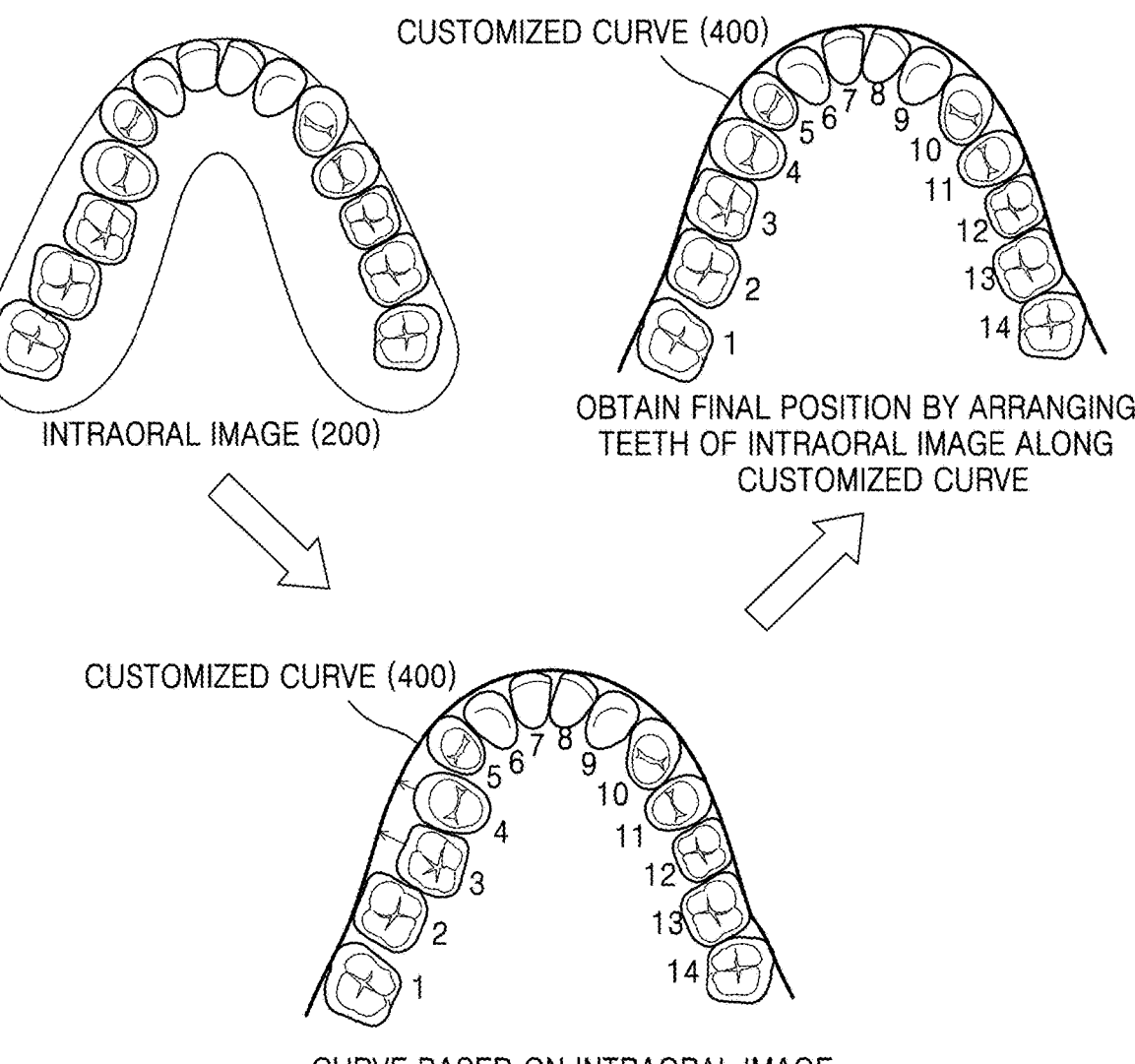
FIG. 4 is a reference diagram for describing a method of obtaining a final position of teeth, according to an embodiment.

For example, referring to FIG. 4, the data processing apparatus 100 may obtain an intraoral image 200.

In operation 320, the data processing apparatus may segment the teeth of the intraoral image. Segmenting the teeth of the intraoral image may mean obtaining information about each of the teeth included in the intraoral image. The information about each tooth may include information about the shape of each tooth, information about the position of each tooth, and information about the number of each tooth.

According to an embodiment, the data processing apparatus may segment the teeth of the intraoral image by using tooth model data. The tooth model data may be template model data in which the teeth have an ideal shape and are arranged at an ideal position, and the data processing apparatus may segment the teeth of the intraoral image by aligning the teeth of the intraoral image and the tooth model data.

According to an embodiment, the data processing apparatus may segment the teeth of the intraoral image through neural network learning (training) based on artificial intelligence.

According to an embodiment, the data processing apparatus may segment the teeth of the intraoral image based on the curvature distribution of points constituting the teeth of the intraoral image.

In operation 330, the data processing apparatus may generate a customized curve based on one or more teeth included in the intraoral image. It may be referred to as the "customized curve" in the sense that the curve is generated based on one or more teeth included in the intraoral image of the patient.

According to an embodiment, the data processing apparatus may generate a customized curve based on teeth at a predetermined position among the teeth included in the intraoral image. The predetermined position may be the position of the tooth with the least tooth movement. For example, the teeth with little tooth movement may be teeth #2, #5, #10, and #13. Thus, one or more of the teeth #2, #5, #10, and #13 may be selected as reference teeth for curve generation. When the teeth at the predetermined position are damaged, adjacent teeth may be used.

According to an embodiment, the data processing apparatus may select one or more teeth among the teeth included in the intraoral image and generate a customized curve based on position information of the selected teeth, for example, coordinate values thereof.

In this case, the data processing apparatus may generate a customized curve based on various features of the teeth.

According to an embodiment, the data processing apparatus may select one or more teeth among the teeth included in the intraoral image and generate a customized curve based on the outermost point of the selected teeth.

According to an embodiment, the data processing apparatus may select one or more teeth among the teeth included in the intraoral image and generate a customized curve based on the uppermost point of the selected teeth.

According to an embodiment, the data processing apparatus may select one or more teeth among the teeth included in the intraoral image and generate a customized curve based on the buccal point of the selected teeth.

According to an embodiment, the data processing apparatus may select one or more teeth among the teeth included in the intraoral image, adjust the position of the selected teeth, and generate a customized curve based on the adjusted position.

According to an embodiment, the data processing apparatus may adjust the position of the selected tooth by performing an operation of moving the position of the selected tooth such that the angle formed by the selected tooth and the teeth adjacent to the selected tooth may be equal to or greater than a certain angle.

According to an embodiment, when the customized curve generated based on the selected teeth has a concave portion, the data processing apparatus may adjust the position of the selected tooth by performing an operation of moving the position of the selected teeth corresponding to the concave portion.

According to an embodiment, the data processing apparatus may adjust the position of the selected tooth by performing an operation of comparing the Z coordinates of two teeth corresponding to front teeth among the selected teeth and, when the Z coordinates thereof are different from each other, moving the position of the front teeth such that the different Z coordinates may be matched to each other.

According to an embodiment, the data processing apparatus may generate an upper-jaw customized curve for an upper-jaw intraoral image according to the method described above and obtain a lower-jaw customized curve by moving the generated upper-jaw customized curve by a predetermined offset.

According to an embodiment, the data processing apparatus may generate an upper-jaw customized curve for an upper-jaw intraoral image according to the method described above and obtain a lower-jaw customized curve generated based on the generated upper-jaw customized curve, and in this case, a final upper-jaw customized curve and a final lower-jaw customized curve may be respectively obtained by moving both the upper-jaw customized curve and the lower-jaw customized curve by certain offsets in the Y-axis direction.

FIG. 4 is a reference diagram for describing a method of obtaining a final position of teeth, according to an embodiment.

For example, referring to FIG. 4, the data processing apparatus may obtain a tooth area image by separating a tooth area from the intraoral image 200 and then generate a customized curve 400 based on one or more teeth included in the tooth area image.

In operation 340, the data processing apparatus may obtain the final positions of the teeth by arranging the teeth segmented from the intraoral image to be aligned with the customized curve generated in operation 330.

According to an embodiment, the data processing apparatus may primarily align the teeth segmented from the intraoral image with the tooth model data and obtain the final positions of the teeth by moving the primarily aligned teeth to be aligned with the customized curve generated in operation 330.

According to an embodiment, the data processing apparatus may obtain the final positions of the teeth by directly arranging the teeth segmented from the intraoral image to be aligned with the customized curve generated in operation 330, without the process of aligning the segmented teeth with the tooth model data.

Also, the intraoral image processing method according to embodiments may further include an operation of displaying an image representing the final positions of the teeth, which has been generated in operation 340.

Alternatively, the intraoral image processing method according to embodiments may further include an operation of transmitting an image representing the final tooth position generated in operation 340 to an external device (e.g., the dentist's computing device).

The intraoral image processing method according to embodiments will be described below in detail with reference to FIGS. 5 to 10.

Figure 5:
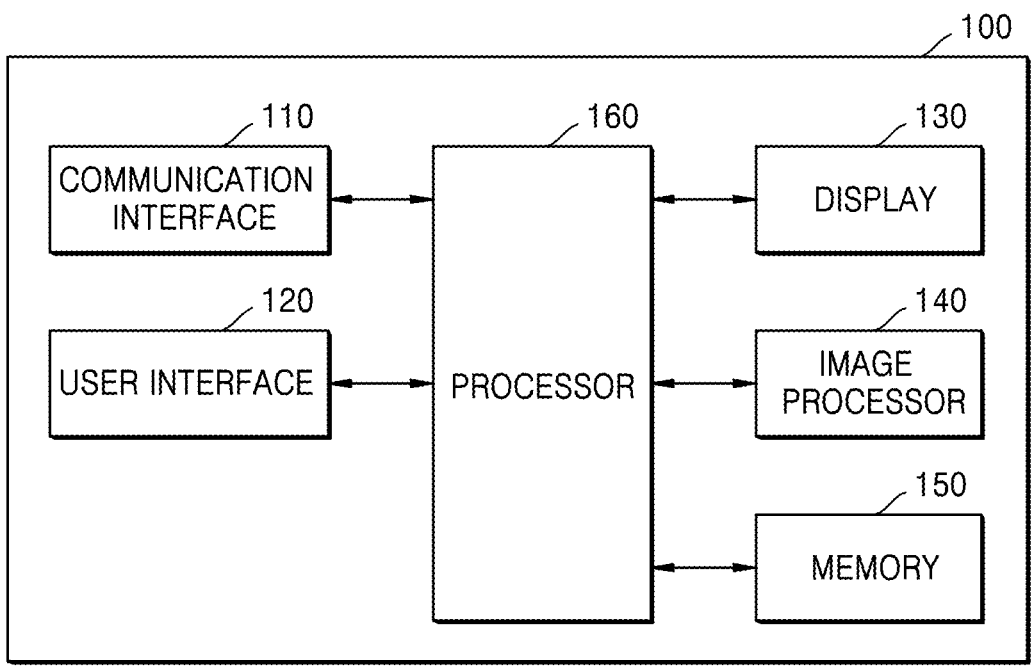
FIG. 5 is a block diagram illustrating a data processing apparatus 100 according to embodiments.

FIG. 5 is a block diagram illustrating a data processing apparatus 100 according to embodiments.

The intraoral image processing method illustrated in FIG. 3 may be performed through the data processing apparatus 100. Thus, the intraoral image processing method illustrated in FIG. 3 may correspond to a flowchart illustrating the operations of the data processing apparatus 100.

Referring to FIG. 5, the data processing apparatus 100 may include a communication interface 110, a user interface 120, a display 130, an image processor 140, a memory 150, and a processor 160.

The communication interface 110 may perform communication with at least one external electronic device through a wired or wireless communication network. Particularly, the communication interface 110 may communicate with the intraoral scanner 10 under the control by the processor 160. The communication interface 110 may perform communication with an external electronic device or a server connected through a wired/wireless communication network under the control by the processor.

The communication interface 110 may communicate with an external electronic device (e.g., an intraoral scanner, a server, or an external medical device) through a wired or wireless communication network. Particularly, the communication interface may include at least one short-range communication module performing communication according to the communication standard such as Bluetooth, Wi-Fi, Bluetooth Low Energy (BLE), NFC/RFID, Wi-Fi Direct, UWB, or ZigBee.

Also, the communication interface 110 may further include a long-range communication module performing communication with a server for supporting long-range communication according to the long-range communication standard. Particularly, the communication interface 110 may include a long-range communication module performing communication through a network for Internet communication. Also, the communication interface may include a long-range communication module performing communication through a communication network conforming to the communication standard such as 3G, 4G, and/or 5G.

Also, in order to communicate by wire with an external electronic device (e.g., an intraoral scanner), the communication interface 110 may include at least one port for being connected to the external electronic device through a wired cable. Accordingly, the communication interface 110 may perform communication with the external electronic device connected by wire through the at least one port.

The user interface 120 may receive a user input for controlling the data processing apparatus. The user interface 120 may include, but is not limited to, a user input device including a touch panel for sensing a user's touch, a button for receiving a user's push operation, and/or a mouse or a keyboard for designating or selecting a point on a user interface screen.

Also, the user interface 120 may include a voice recognition device for voice recognition. For example, the voice recognition device may be a microphone, and the voice recognition device may receive a user's voice command or voice request. Accordingly, the processor may control an operation corresponding to the voice command or voice request to be performed.

The display 130 may display a screen. Particularly, the display 130 may display a certain screen under the control by the processor 160. Particularly, the display 130 may display a user interface screen including the intraoral image generated based on the data obtained by scanning the patient's oral cavity by the intraoral scanner 10. Alternatively, the display 130 may display a user interface screen including information related to the patient's dental treatment.

The image processor 140 may perform operations for generating and/or processing an image. Particularly, the image processor 140 may receive the raw data obtained from the intraoral scanner 10 and generate an intraoral image based on the received data. Particularly, the image processor 140 may generate a customized curve for obtaining the final positions of the teeth in the orthodontic plan based on one or more teeth included in the patient's intraoral image and obtain the final positions of the teeth in the orthodontic plan by aligning one or more teeth included in the intraoral image the teeth by using the generated curve.

The memory 150 may store at least one instruction. Also, the memory 150 may store at least one instruction executed by the processor. Also, the memory 160 may store at least one program executed by the processor 160. Also, the memory 150 may store data received from the intraoral scanner (e.g., raw data obtained through intraoral scanning). Alternatively, the memory may store an intraoral image three-dimensionally representing the oral cavity. According to an embodiment, the memory 150 may include one or more instructions for obtaining the final positions of the teeth of the intraoral image in the orthodontic plan. According to an embodiment, the memory 150 may include one or more instructions for performing the method described herein to obtain the final positions of the teeth of the intraoral image.

The processor 160 may execute at least one instruction stored in the memory 150 to perform control such that a desired operation may be performed. Here, the at least one instruction may be stored in an internal memory included in the processor 160 or in the memory 150 included in the data processing apparatus separately from the processor.

Particularly, the processor 160 may execute at least one instruction to control at least one component included in the data processing apparatus such that a desired operation may be performed. Thus, although a case where the processor performs certain operations is described as an example, it may mean that the processor controls at least one component included in the data processing apparatus such that certain operations may be performed.

According to an embodiment, by executing one or more instructions stored in the memory 150, the processor 160 may obtain an intraoral image generated by scanning teeth, segment teeth of the intraoral image by using tooth model data, generate a customized curve based on one or more teeth included in the intraoral image, and obtain a final position of teeth by arranging teeth segmented from the intraoral image to be aligned with the customized curve.

According to an embodiment, by executing one or more instructions stored in the memory 150, in order to segment the teeth of the intraoral image by using the tooth model data, the processor 160 may separate each of the teeth of the intraoral image by using information about the teeth included in the tooth model data and obtain at least one piece of shape information, position information, and number information of each of the separated teeth.

According to an embodiment, by executing one or more instructions stored in the memory 150, in order to generate a customized curve based on one or more teeth included in the intraoral image, the processor 160 may determine a certain number of teeth among the teeth included in the intraoral image according to a predetermined reference and generate a customized curve based on the features of the certain number of determined teeth. The features of the teeth may include the outermost point or the uppermost point of the teeth.

According to an embodiment, by executing one or more instructions stored in the memory 150, in order to obtain the final positions of the teeth by arranging the teeth segmented from the intraoral image to be aligned with the customized curve, the processor 160 may align the teeth segmented from the intraoral image by using tooth model data and obtain the final positions of the teeth by moving the aligned teeth by using the tooth model data to be aligned with the customized curve.

According to an embodiment, by executing one or more instructions stored in the memory 150, in order to align the teeth segmented from the intraoral image with the tooth model data, the processor 160 may rotate the teeth segmented from the intraoral image with reference to the direction of the teeth of the tooth model data.

According to an example, the processor 160 may internally include at least one internal processor and a memory device (e.g., RAM or ROM) for storing at least one of programs, instructions, signals, and data to be processed or used by the internal processor.

Also, the processor 160 may include a graphic processor (graphic processing unit) for graphic processing corresponding to video. Also, the processor may be implemented as a System-on-Chip (SoC) including a combination of a core and a GPU. Also, the processor may include a single core or a multi-core. For example, the processor may include a dual core, a triple core, a quad core, a hexa core, an octa core, a deca core, a dodeca core, a hexadecimal core, and/or the like.

In embodiments, the processor 160 may generate an intraoral image based on the 2D image received from the intraoral scanner 10.

Particularly, under the control by the processor 160, the communication interface 110 may receive the data obtained by the intraoral scanner 10, for example, the raw data obtained through intraoral scanning. Based on the raw data received by the communication interface, the processor 160 may generate a 3D intraoral image three-dimensionally representing the oral cavity. For example, in order to restore a 3D image according to an optical triangulation method, the intraoral scanner may include an L camera corresponding to the left field of view and an R camera corresponding to the right field of view. The intraoral scanner may obtain L image data corresponding to the left field of view and R image data corresponding to the right field of view from the L camera and the R camera, respectively. Subsequently, the intraoral scanner (not illustrated) may transmit raw data including the L image data and the R image data to the communication interface of the data processing apparatus 100.

Then, the communication interface 110 may transmit the received raw data to the processor, and the processor may generate an intraoral image three-dimensionally representing the oral cavity based on the received raw data.

Also, the processor 160 may control the communication interface to directly receive an intraoral image three-dimensionally representing the oral cavity from an external server, a medical device, or the like. In this case, the processor may obtain a 3D intraoral image without generating a 3D intraoral image based on the raw data.

According to embodiments, the processor 160 performing operations such as "extracting", "obtaining", and "generating" may include not only the processor 160 executing at least one instruction to directly perform the above operations but also the processor 160 controlling other components to perform the above operations.

In order to implement the embodiments disclosed herein, the data processing apparatus 100 may include only some of the components illustrated in FIG. 5 or may include more components than the components illustrated in FIG. 5.

Also, the data processing apparatus 100 may store and execute dedicated software linked to the intraoral scanner. Here, the dedicated software may also be referred to as a dedicated program, a dedicated tool, or a dedicated application. When the data processing apparatus 100 operates in conjunction with the intraoral scanner 10, the dedicated software stored in the data processing apparatus 100 may be connected to the intraoral scanner 10 to receive the data obtained through intraoral scanning in real time. For example, there is dedicated software for processing data obtained through intraoral scanning by the i500 product as the Medit intraoral scanner. Particularly, Medit produces and distributes "Medit Link" as software for processing, managing, using, and/or transmitting data obtained by the intraoral scanner (e.g., i500). Here, because the "dedicated software" refers to a program, a tool, or an application operable in conjunction with the intraoral scanner, various intraoral scanners developed and sold by various manufacturers may be used in common. Also, the above dedicated software may be produced and distributed separately from the intraoral scanner for performing intraoral scanning.

The data processing apparatus 100 may store and execute dedicated software corresponding to the i500 product. The dedicated software may perform one or more operations for obtaining, processing, storing, and/or transmitting the intraoral image. Here, the dedicated software may be stored in the processor. Also, the dedicated software may provide a user interface for using the data obtained by the intraoral scanner. Here, the user interface screen provided by the dedicated software may include the intraoral image generated according to embodiments.

Figure 6:
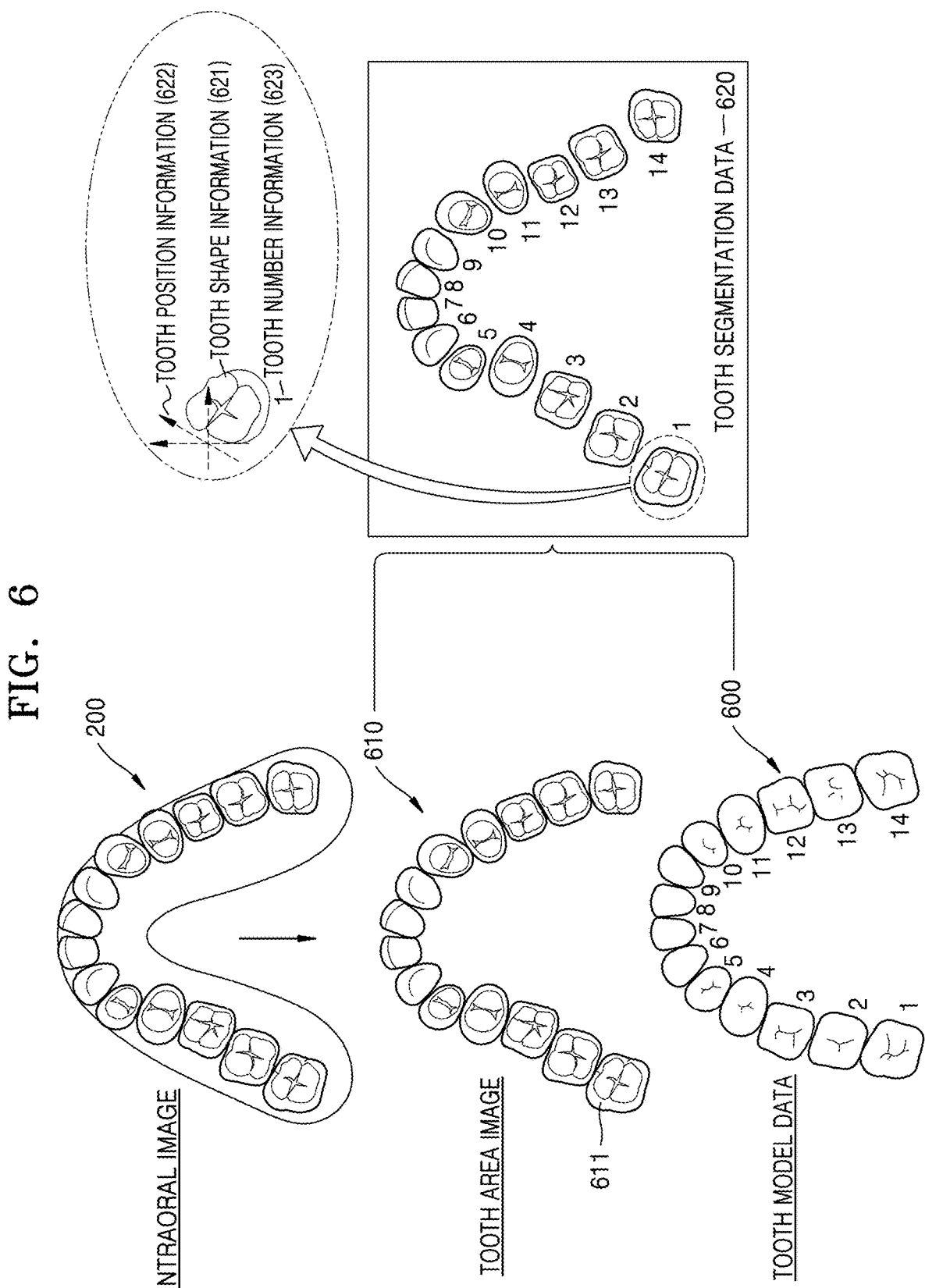
FIG. 6 is a reference diagram for describing a method of segmenting an intraoral image by using tooth model data, according to an embodiment.

FIG. 6 is a reference diagram for describing a method of segmenting an intraoral image by using tooth model data, according to an embodiment.

The intraoral image 200 may represent an image obtained by scanning the patient's oral cavity.

Tooth model data 600 may represent 3D tooth model data representing the most ideal dentition. The tooth model data 600 may be tooth data in which each tooth has an ideal shape and which has an ideal arrangement state of the teeth, and a tooth number may be given to each tooth of the tooth model data 600. The tooth model data 600 may include shape data about each tooth, position data about each tooth, and a tooth number of each tooth. Referring to FIG. 6, the tooth model data 600 may include 14 teeth, and the 14 teeth may be respectively given #1 to #14 sequentially from the left molar.

The data processing apparatus may obtain a tooth area image 610 by separating the tooth area by separating the teeth and the gums in the intraoral image based on the curvature thereof. The data processing apparatus may assign a number to each tooth of the tooth area image 610 by aligning the tooth model data 600 with the tooth area image 610. When the data processing apparatus 100 aligns the tooth model data 600 with the tooth area image 610, the data processing apparatus 100 may use various alignment algorithms and may use, for example, a known iterative closest point (ICP) algorithm. The ICP may be an algorithm for minimizing the difference between two point clouds and may be an algorithm used to reconstruct a 2D or 3D surface from different scan data. The ICP algorithm may fix a point cloud referred to as a reference and transform a point cloud referred to as a source to best match the reference. The ICP algorithm may align the 3D model by repeatedly modifying a transformation (a combination of translation and rotation) necessary to minimize the error metric representing the distance from the source to the reference. In addition to the ICP algorithm, various other algorithms, for example, the Kabsch algorithm, may be used as the alignment algorithm.

When the data processing apparatus 100 uses the ICP algorithm to align the tooth model data 600 with the tooth area image 610 extracted from the intraoral image 200, a point cloud corresponding to the tooth area image 610 may be a reference and a point cloud corresponding to the tooth model data may be a source.

As a result of searching the tooth model data 600 for a tooth having the closest shape to a tooth 611 that is the first tooth in the tooth area image 610, the data processing apparatus 100 may determine that a tooth corresponding to a tooth number #1 of the tooth model data 600 is the tooth having the closest shape to the tooth 611 of the tooth area image 610. As such, the tooth number may be obtained by searching the tooth model data 600 for the tooth closest to each tooth of the tooth area image 610.

As such, the data processing apparatus may obtain tooth segmentation data 620 including information about each tooth by segmenting the tooth area image 610 extracted from the intraoral image by using the tooth model data 600. The tooth segmentation data 620 may include tooth shape information 621, tooth position information 622, and tooth number information 623 of each tooth included in the tooth area image 610.

Figure 7:
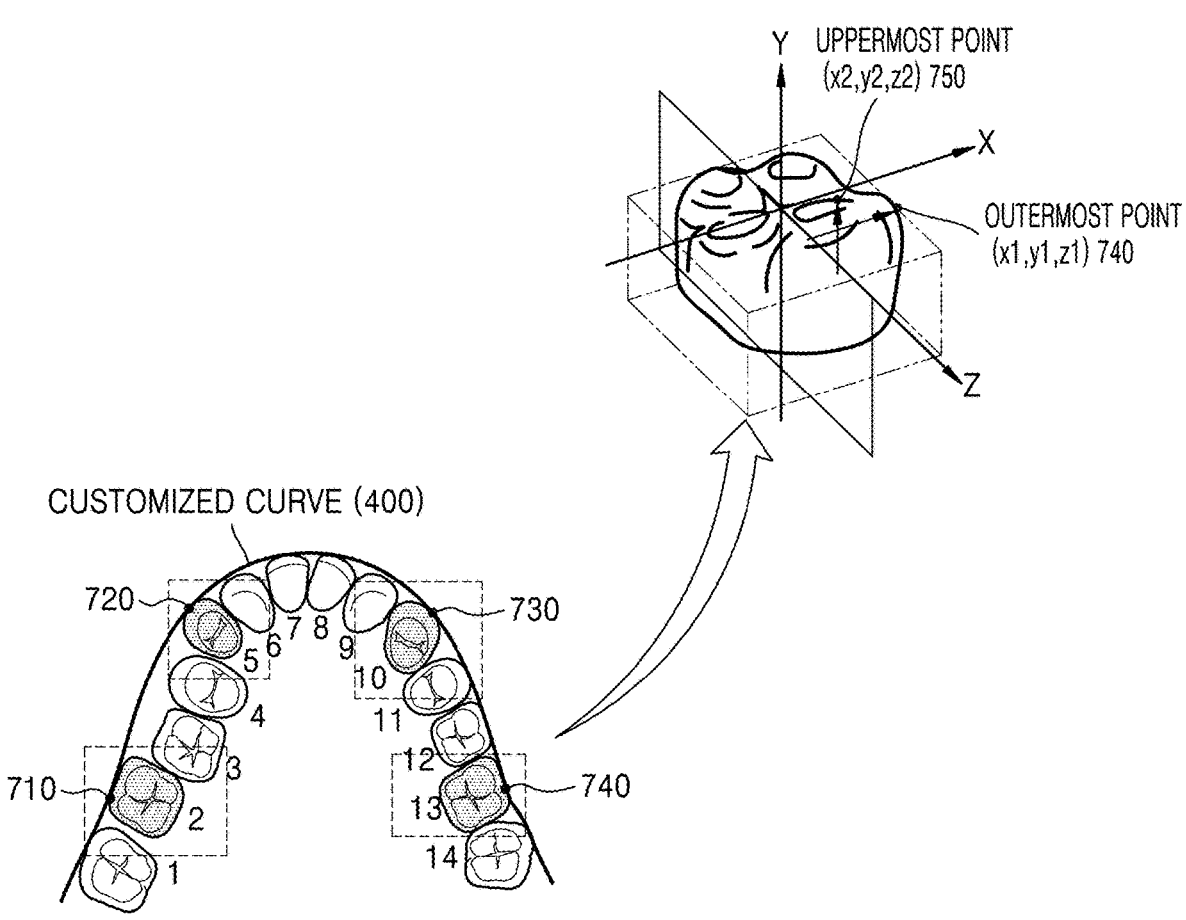
FIG. 7 is a reference diagram for describing a method of generating a customized curve for a final tooth position based on one or more teeth included in an intraoral image, according to an embodiment.

FIG. 7 is a reference diagram for describing a method of generating a customized curve for a final tooth position based on one or more teeth included in an intraoral image, according to an embodiment.

According to an embodiment, the data processing apparatus 100 may generate a customized curve based on one or more teeth among the teeth included in the patient's intraoral image. Which teeth to be used as a basis for generating the customized curve or the number of teeth to be used as a basis for generating the customized curve may be variously determined.

According to an embodiment, the data processing apparatus 100 may determine teeth that are a basis for generating the customized curve, as teeth with a small movement amount among the teeth. For example, the teeth with a small movement amount may be tooth number #2, tooth number #5, tooth number #10, and tooth number #13. These teeth may not be easily moved due to their deepest roots, and when a curve is generated based on these teeth, the line of the curve may be derived as an aesthetical line. Thus, the data processing apparatus 100 may select one or more teeth among tooth number #2, tooth number #5, tooth number

10, and tooth number #13 as teeth that are a basis for generating the customized curve. For example, as teeth that are a basis for generating the customized curve, the data processing apparatus 100 may select all of tooth number #2, tooth number #5, tooth number #10, and tooth number #13 or may selectively use some of these teeth.

According to an embodiment, when teeth determined as the teeth that are a basis for generating the customized curve are damaged teeth among the teeth of the intraoral image, the data processing apparatus 100 may use teeth adjacent to the damaged teeth as teeth that are a basis for generating the customized curve.

According to an embodiment, the data processing apparatus 100 may determine a tooth used as a basis for generating the customized curve and then determine which point of the determined tooth the customized curve is to pass through. When teeth are aligned with the customized curve, shapes thereof may be aligned according to various features of the teeth. The features of the teeth may include cusps, fossae, ridges, distance-based metrics, or shape-based metrics.

According to an embodiment, the data processing apparatus 100 may determine to generate a customized curve along the outermost points of determined teeth. The curve may represent a set of 3D coordinates.

Referring to FIG. 7, for example, when the upward direction of the tooth, that is, the vertical direction of an occlusion surface, is referred to as the Y-axis direction and the plane seen from the top is referred to as the XZ plane, a customized curve may be generated based on the outer points of the teeth that meet when projected from the tooth center to the outside on the XZ plane. For example, referring to FIG. 7, a customized curve may be generated to pass through an outermost point (x1, y1, z1) 740 of the tooth in tooth #13. That is, the outermost point 740 may be a point having the greatest value of x1 among the coordinates of the points constituting the surface of tooth #13. As such, as illustrated, a customized curve 400 may be generated to pass through an outer point 710 of tooth number #2, an outer point 720 of tooth number #5, an outer point 730 of tooth number #10, and an outer point 740 of tooth number #13.

According to an embodiment, the data processing apparatus 100 may determine to generate a customized curve along the uppermost points of determined teeth.

Referring to FIG. 7, for example, a customized curve may be generated based on an uppermost point (x2, y2, z2) 750 in the Y-axis direction based on the XZ plane of the tooth. That is, the uppermost point 750 may be a point having the greatest value of y1 among the coordinates of the points constituting the surface of tooth #13. As such, the uppermost point may be, for example, the cusp feature associated with each tooth, and the cusp may be a pointed protrusion protruding on the chewing surface of the tooth.

The data processing apparatus may generate a customized curve to pass through the upper point of tooth number #2, the upper point of tooth number #5, the upper point of tooth number #10, and the upper point of tooth number #13.

Figure 8:
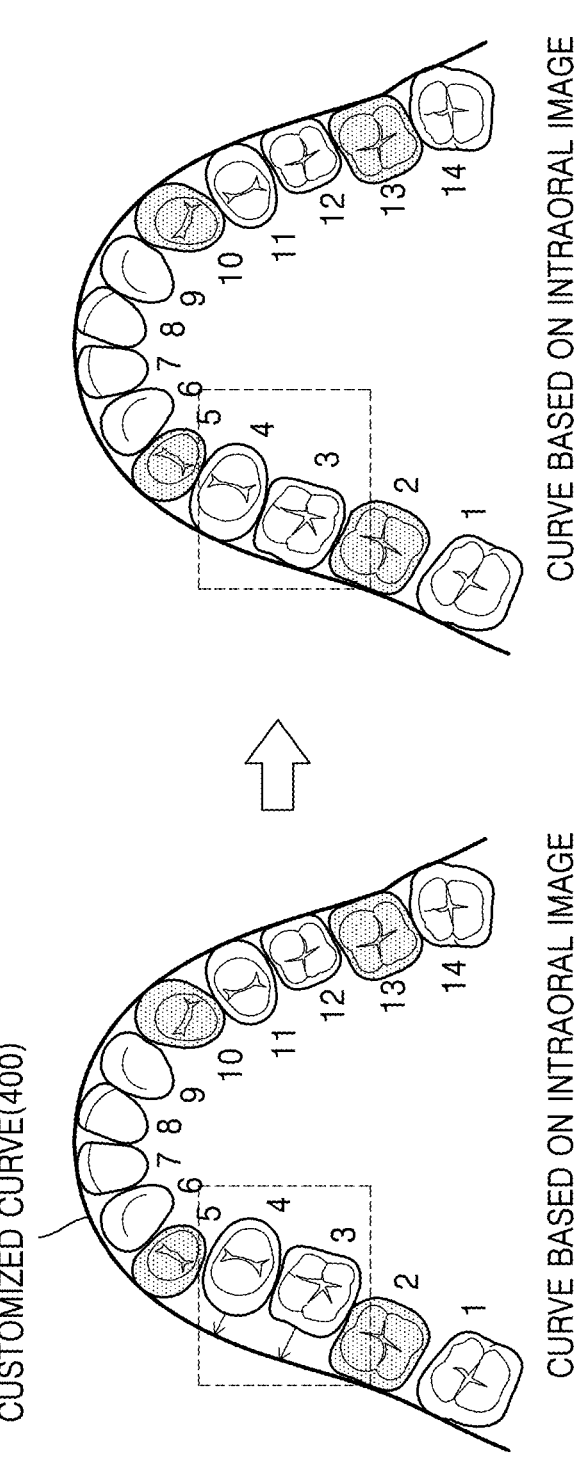
FIG. 8 illustrates an example of a method of obtaining a final position of teeth by arranging teeth to be aligned with a generated customized curve, according to an embodiment.

FIG. 8 illustrates an example of a method of obtaining a final position of teeth by arranging teeth to be aligned with a generated customized curve, according to an embodiment.

The data processing apparatus may generate a customized curve based on one or more teeth included in the intraoral image and then move the positions of one or more teeth to align one or more teeth included in the intraoral image with the generated customized curve.

Referring to FIG. 8, teeth #3 and #4 may not contact the generated customized curve to be spaced apart therefrom, and the other teeth may contact the customized curve 400. Thus, the data processing apparatus may obtain the final positions of the teeth by moving the position of teeth #3 and #4, which are spaced apart from the customized curve, to contact the customized curve in order to align the teeth with the customized curve 400. When the position of teeth #3 and #4 spaced apart therefrom is moved, the teeth may be moved by using the coordinate values of each tooth and the coordinate values of the customized curve. Also, in this case, when tooth rotation as well as tooth movement is required, the data processing apparatus may rotate the tooth with reference to the shape of the tooth of the corresponding tooth number included in the tooth model data.

As such, in the example illustrated in FIG. 8, the final positions of the teeth in the orthodontic plan may be obtained by adjusting or correcting the positions of the teeth included in the intraoral image to be aligned with the customized curve generated based on the teeth of the intraoral image.

Figure 9A:
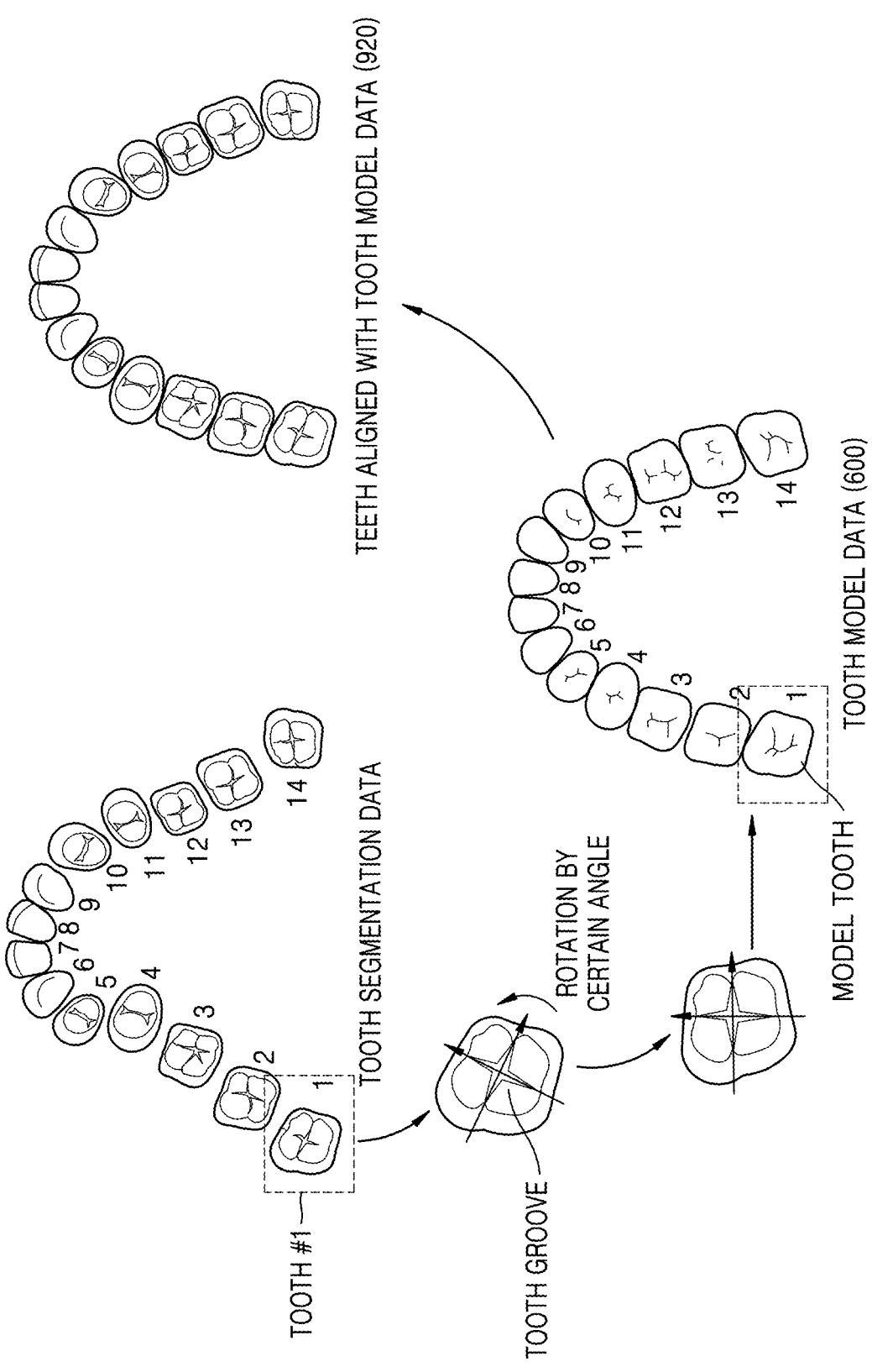
FIG. 9A is a reference diagram for describing another example of a method of obtaining a final position of teeth by arranging teeth to be aligned with a generated customized curve, according to an embodiment.

FIG. 9A is a reference diagram for describing another example of a method of obtaining a final position of teeth by arranging teeth to be aligned with a generated customized curve, according to an embodiment.

In the example illustrated in FIG. 8, the final positions of the teeth are obtained by aligning the teeth included in the intraoral image with the customized curve generated based on the teeth of the intraoral image. On the other hand, in the example illustrated in FIG. 9A, the final positions of the teeth may be obtained by primarily aligning the teeth included in the intraoral image with the tooth model data and then again aligning the teeth aligned with the tooth model data with the customized curve generated based on the teeth included in the intraoral image.

Referring to FIG. 9A, the data processing apparatus may locate each tooth of the tooth segmentation data obtained by segmenting the teeth of the intraoral image to be aligned with the tooth model data. Aligning each tooth of the tooth segmentation data with the tooth model data may include not only locating each tooth of the tooth segmentation data with reference to positional information of each corresponding tooth included in the tooth model data but also rotating and arranging the teeth by using the shape information of each tooth of the tooth model data such that the shape of the teeth may match the shape of the model teeth.

For example, when tooth #1 of the tooth segmentation data is aligned with the tooth model data, tooth #1 may be rotated by a certain angle such that the direction of the tooth groove of tooth #1 may match the direction of the tooth groove of model tooth #1 and the rotated tooth #1 may be arranged at the position of model tooth #1. In this way, as for all the teeth included in the tooth segmentation data, teeth 920 aligned with the tooth model data may be obtained by aligning the teeth with reference to the direction of each model tooth of the tooth model data and then aligning the same with the corresponding position. As such, the direction of each tooth may be correctly arranged by aligning the teeth of the tooth segmentation data with reference to the model teeth of the tooth model data.

The operation illustrated in FIG. 9A, that is, an operation of aligning the teeth of the tooth segmentation data based on the tooth model data, may be performed through an algorithm for performing tooth segmentation, for example, the ICP algorithm described above.

Figure 9B:
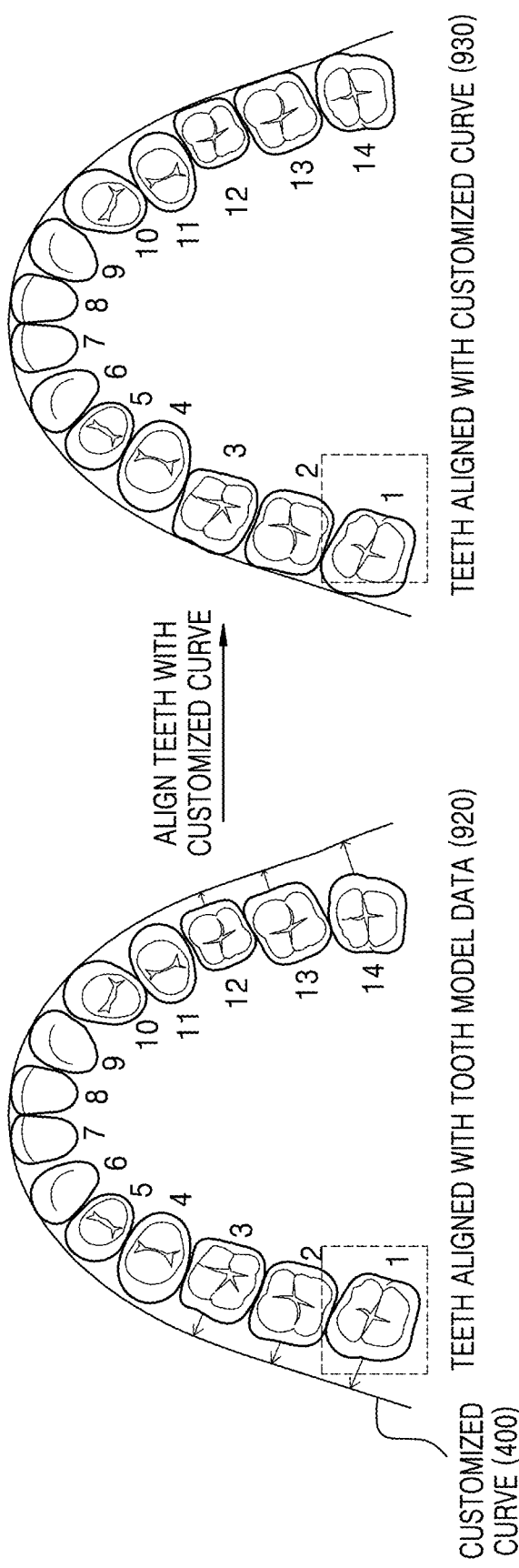
FIG. 9B is a reference diagram for describing another example of a method of obtaining a final position of teeth by arranging teeth to be aligned with a generated customized curve, according to an embodiment.

FIG. 9B is a reference diagram for describing another example of a method of obtaining a final position of teeth by arranging teeth to be aligned with a generated customized curve, according to an embodiment.

Referring to FIG. 9B, the data processing apparatus may move the positions of the teeth aligned with the tooth model data to be aligned with the customized curve 400. That is, because the tooth model data has a curve representing an ideal dental arch but may be much different from the patient's dental arch, the data processing apparatus may obtain the final position of natural teeth more suitable for the patient's dental arch by again aligning the teeth aligned with the tooth model data with the customized curve generated based on the patient's teeth.

Referring FIG. 9B, the position of tooth number #1 may be moved to be aligned with the customized curve 400. As illustrated in FIG. 9A, because each tooth is in a state where the tooth model data is rotated, when tooth #1 is aligned with the customized curve 400, only the position of the tooth may need to be moved; that is, a certain point of tooth #1 may be arranged to meet the customized curve 400 by moving tooth #1 by a certain distance in the horizontal direction and by a certain distance in the vertical direction.

The patient's final tooth position obtained according to the embodiments described above may be used in each stage of an actual orthodontic treatment. Also, by showing the patient the final position of the patient's teeth obtained as such, it may be possible for the patient to recognize the final tooth position targeted by the orthodontic treatment.

Figure 10:
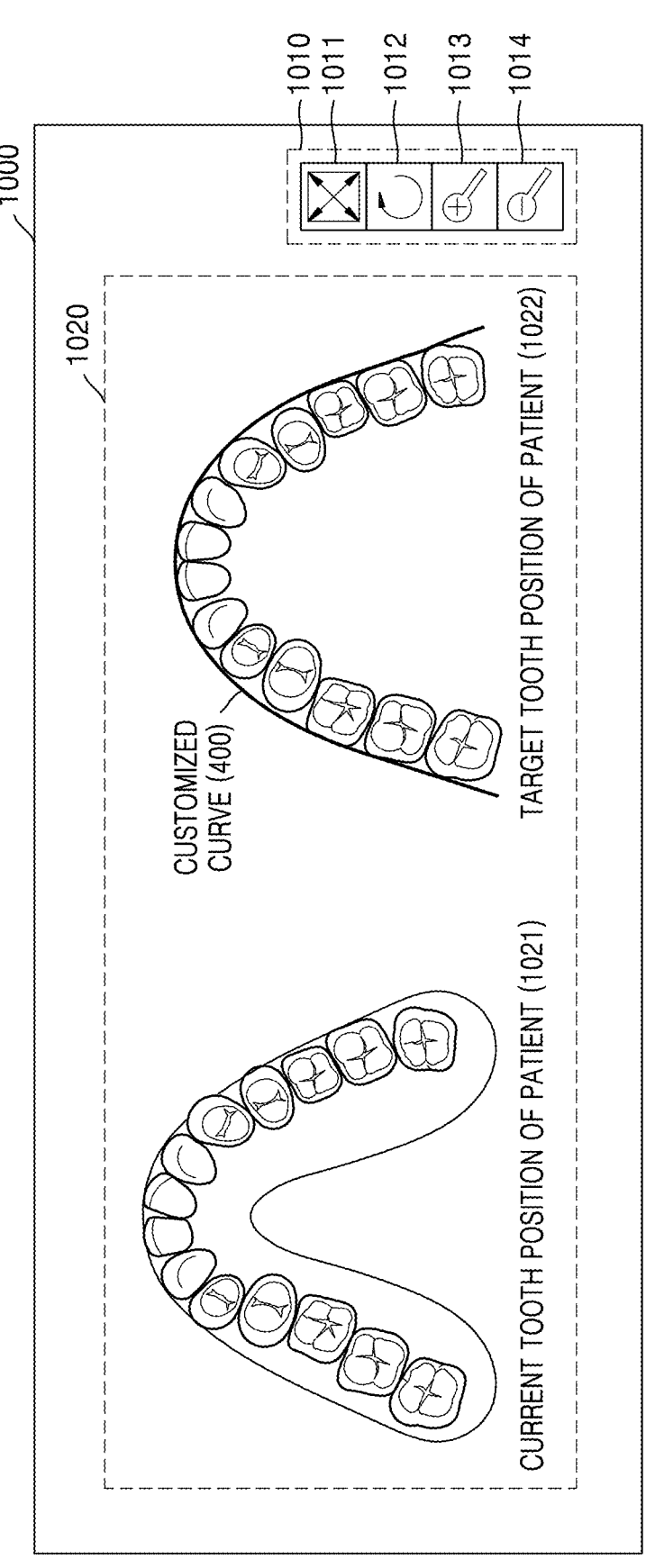
FIG. 10 illustrates an example of a user interface displaying a final position of the patient's teeth for an orthodontic plan, according to an embodiment.

FIG. 10 illustrates an example of a user interface displaying a final position of the patient's teeth for an orthodontic plan, according to an embodiment.

The data processing apparatus 100 may generate a user interface screen 1000 including the intraoral image and visually output the same through a display. Here, the user interface screen 1000 may include one or more menu bars for allowing the user (e.g., the dentist) to use data obtained by scanning the teeth by using the intraoral scanner.

The user interface screen 1000 may include a menu bar 1010 including at least one menu for editing or changing the obtained intraoral image. For example, the menu bar 1010 may include menus including a full-screen view menu 1011, a previous image view menu 1012, an intraoral image expansion menu 1013, and an intraoral image reduction menu 1014.

The user interface screen 1000 may include a window 1020 for showing the orthodontic plan of the patient undergoing the orthodontic treatment. The window 1020 may allow the patient to be informed what tooth position the patient's current teeth will have after tooth adjustment, by showing a current tooth position 1021 displayed by scanning the current teeth of the patient undergoing the orthodontic treatment, a target tooth position 1022 of the patient generated based on the current tooth position of the patient according to the description given with reference to FIGS. 1 to 9, and the customized curve 400 together.

According to an embodiment, when the customized curve for the final tooth position is generated based on one or more teeth included in the intraoral image, the teeth used as a basis for generating the customized curve may be determined and then which point of the determined teeth the customized curve is to pass through may be variously determined.

Figure 11:
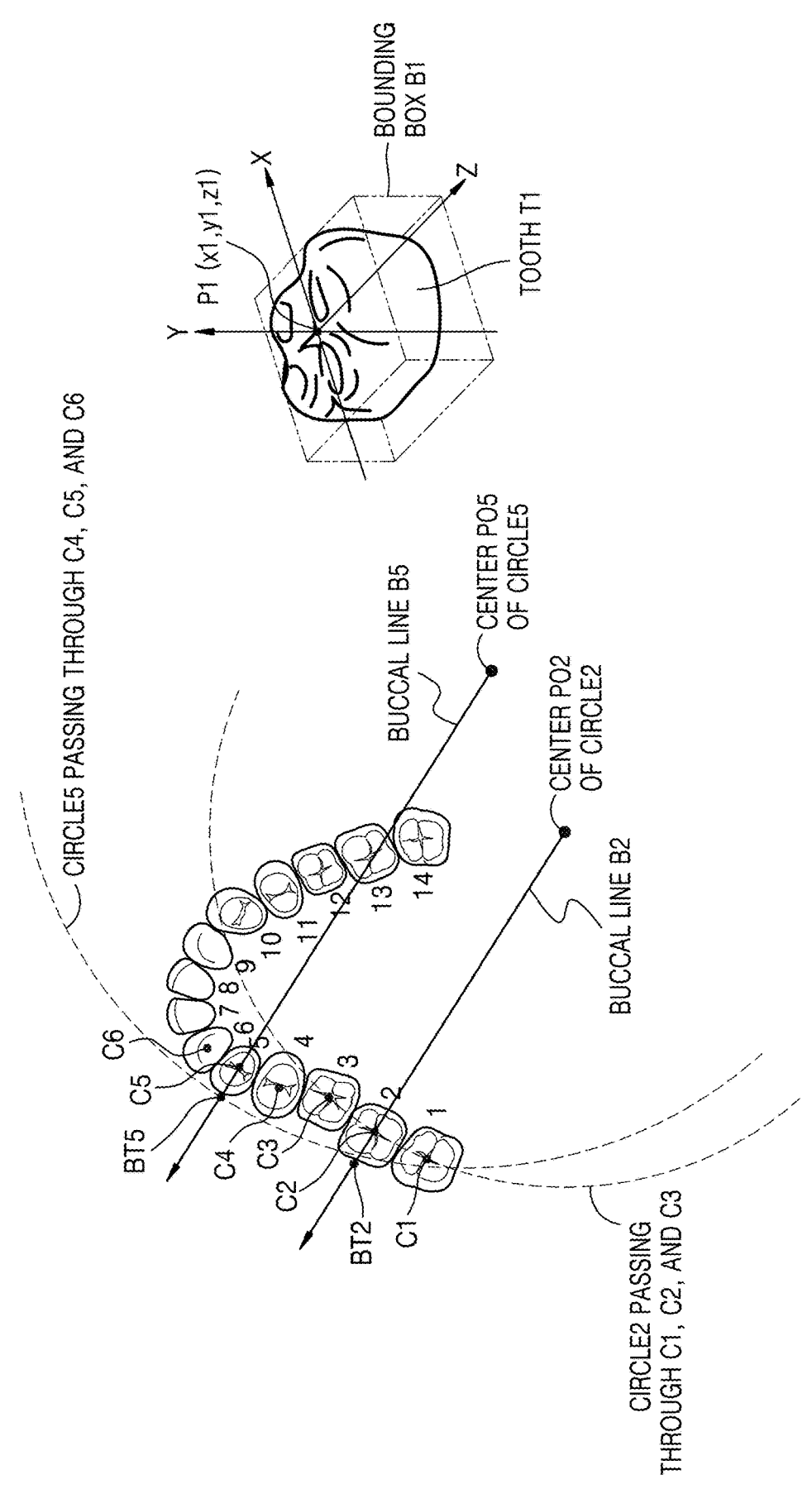
FIG. 11 is a reference diagram for describing an example of a method of determining a point through which a customized curve passes in a tooth used as a basis for generating a customized curve, according to an embodiment.

FIG. 11 is a reference diagram for describing an example of a method of determining a point through which a customized curve passes in a tooth used as a basis for generating a customized curve, according to an embodiment.

According to an embodiment, as for a tooth used as a basis for generating the customized curve among the teeth included in the intraoral image, the data processing apparatus 100 may obtain the coordinates of a point through which the customized curve passes by using a point where a buccal line corresponding to the tooth meets the tooth (hereinafter referred to as a buccal point BT).

According to an embodiment, as for a tooth used as a basis for generating the customized curve among the teeth included in the intraoral image, the data processing apparatus 100 may obtain a point through which the customized curve passes by using the center coordinates of teeth adjacent to the tooth.

The points constituting each tooth included in the intraoral image may have 3D coordinates (x, y, z). For example, when a bounding box B1 surrounding a tooth may be obtained based on the 3D coordinates of points constituting a tooth T1, and when the center of the bounding box B1 is P1 (x1, y1, z1), a center C1 of the tooth T1 on the XZ plane may be obtained by projecting P1 onto the XZ plane.

For example, when a tooth T2 with tooth number #2 in the intraoral image of FIG. 11 is determined as a tooth that is a basis for generating the customized curve, the data processing apparatus 100 may obtain a circle CIRCLE2 passing through centers C1 and C3 of a tooth T1 and a tooth C3 adjacent to the tooth T2 on the XZ plane and a center C2 of the tooth T2 on the XZ plane. The data processing apparatus 100 may obtain a buccal line B2 passing through C2 from a center PO2 of CIRCLE2. The data processing apparatus 100 may determine a point through which the customized curve passes with reference to a point BT2 where the buccal line B2 meets the tooth T2 on the outside thereof. Because the buccal point BT2 corresponds to the coordinate on the XZ plane, the data processing apparatus 100 may restore the coordinate of BT2 on the Y axis to determine the point through which the customized curve passes. The data processing apparatus 100 may use the restored coordinate of BT2 on the XYZ coordinate system as position information of the point through which the customized curve passes.

Likewise, when a tooth T5 with tooth number #5 in the intraoral image of FIG. 11 is determined as a tooth that is a basis for generating the customized curve, the data processing apparatus 100 may obtain a circle CIRCLE5 passing through centers C4 and C6 of a tooth T4 and a tooth C6 adjacent to the tooth T5 on the XZ plane and a center C5 of the tooth T5 on the XZ plane. The data processing apparatus 100 may obtain a buccal line B5 passing through C5 from a center PO5 of CIRCLE5. The data processing apparatus 100 may determine a buccal point BT5 where the buccal line B5 meets the tooth T5 on the outside thereof, as a point through which the customized curve passes. Because the buccal point BT5 corresponds to the coordinate on the XZ plane, the data processing apparatus 100 may restore the coordinate of BT5 on the Y axis to determine the point through which the customized curve passes. The data processing apparatus 100 may use the restored coordinate of BT5 on the XYZ coordinate system as position information of the point through which the customized curve passes.

Figure 12:
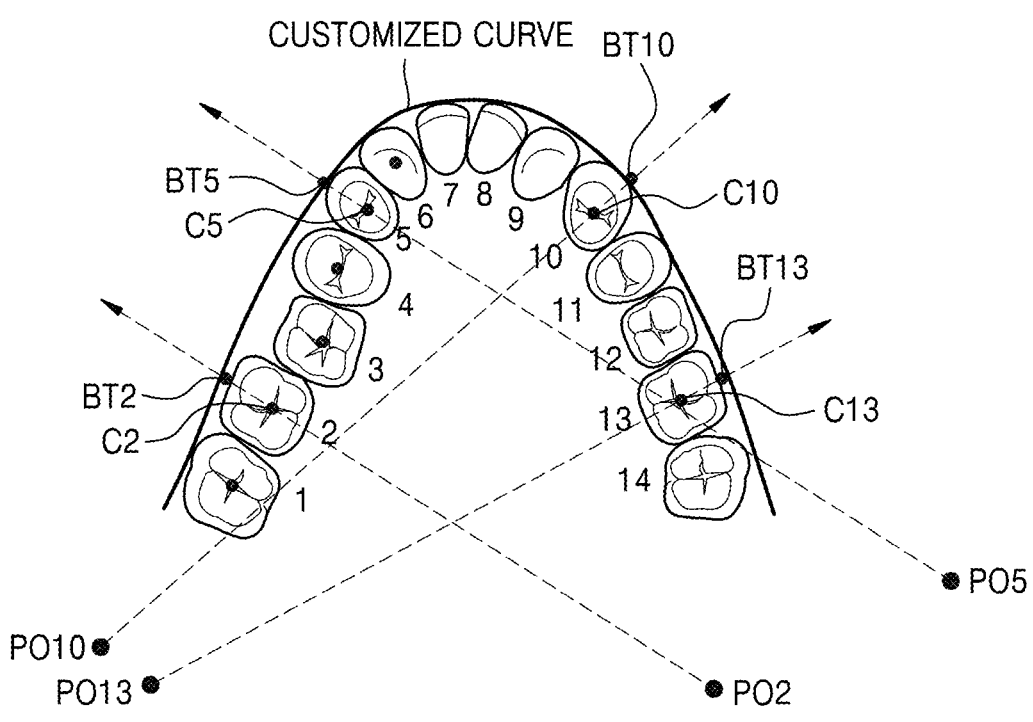
FIG. 12 is a reference diagram for describing an example of a method of generating a customized curve by using a determined point through which a customized curve passes in a tooth used as a basis for generating a customized curve, according to an embodiment.

FIG. 12 is a reference diagram for describing an example of a method of generating a customized curve by using a determined point through which a customized curve passes in a tooth used as a basis for generating a customized curve, according to an embodiment.

Referring to FIG. 12, for example, when a customized curve is generated by using T2, T5, T10, and T13 respectively corresponding to tooth numbers #2, #5, #10, and #13 in the intraoral image, the data processing apparatus 100 may obtain a customized curve based on tooth numbers #2, #5, #10, and #13 by generating a curve passing through BT2 on the XYZ coordinate determined for T2, BT5 on the XYZ coordinate determined for T5, BT10 on the XYZ coordinate determined for T10, and BT13 on the XYZ coordinate determined for T13. A method of determining the buccal points BT2, BT5, BT10, and BT13 for the respective teeth may be the same as described in FIG. 11.

In FIG. 12, according to an example, a customized curve is generated based on tooth numbers #2, #5, #10, and #13 among the teeth included in the intraoral image; however, this is merely an example. The data processing apparatus 100 may suitably determine one or more teeth used as a reference for generating a customized curve among the teeth included in the intraoral image, in accordance with each policy or system.

For example, the data processing apparatus may not necessarily need to limit the number of teeth, which is used as a reference for generating a customized curve, to 4 and may determine less than 4 teeth or more than 4 teeth as teeth used as a reference for generating a customized curve.

For example, the data processing apparatus 100 may not necessarily need to limit the teeth, which are used as a reference for generating a customized curve, to #2, #5, 310, and #13 and may suitably determine the tooth number used as a basis for generating a customized curve.

As described above, the data processing apparatus 100 may determine one or more teeth used as a reference for generating a customized curve (hereinafter referred to as reference teeth) and generate a customized curve based on the determined reference teeth. However, in this case, when the positions of the reference teeth are excessively distorted, because the shape of the customized curve generated based on the reference teeth at the distorted position may also be inevitably distorted, it may be difficult to obtain a customized curve suitable for the patient's teeth. Thus, in order to solve this problem, it may be necessary to adjust the positions of the reference teeth used as a basis for generating the customized curve.

Figure 13:
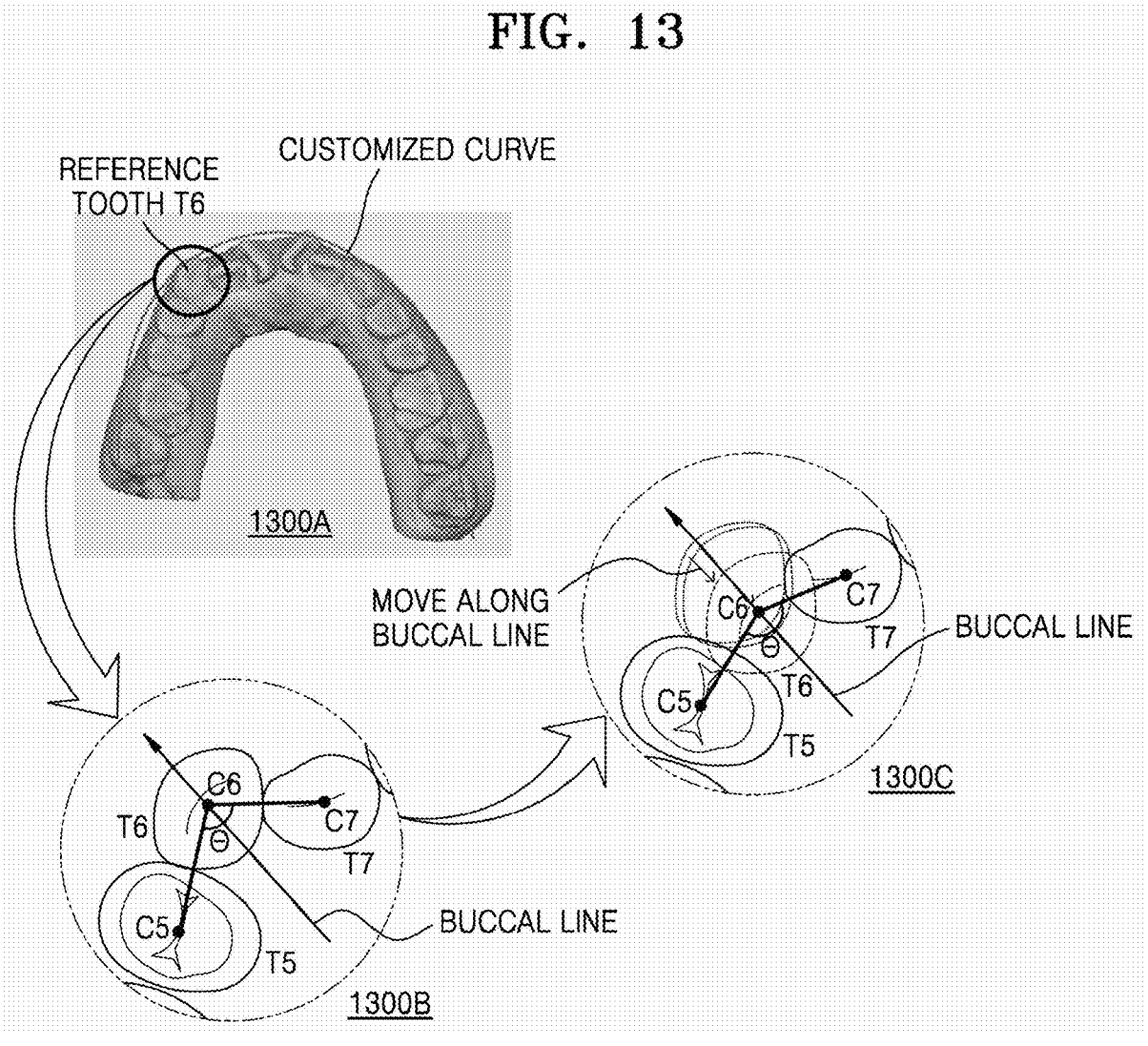
FIG. 13 is a reference diagram for describing an example of a method of adjusting a position of a reference tooth when the position of the reference tooth excessively deviates from a suitable position, according to an embodiment.

FIG. 13 is a reference diagram for describing an example of a method of adjusting a position of a reference tooth when the position of the reference tooth excessively deviates from a suitable position, according to an embodiment.

Referring to FIG. 13, because tooth #6 T6 of the intraoral image has protruded a lot, when the data processing apparatus 100 generates a customized curve by using T6 as a reference tooth, the generated customized curve may be generated in a considerably distorted form (1300A).

Thus, the data processing apparatus 100 may perform an adjustment for moving the reference tooth T6 along the buccal line to adjust the position of the reference tooth T6 (1300B). Particularly, the data processing apparatus 100 may obtain the centers C6, C5, and C7 of the reference tooth T6 and the teeth T5 and T7 adjacent to the reference tooth T6 and, when an angle θ formed by C5, C6, and C7 is less than a predetermined threshold value, determine that it is necessary to adjust the position of the reference tooth T6. For example, when the angle θ formed by C5, C6, and C7 is less than 130 degrees, the data processing apparatus 100 may determine that it is necessary to adjust the position of the reference tooth T6. 130 degrees is an example of the predetermined threshold value, and the predetermined threshold value may be various determined. Also, the predetermined threshold value may be set equally or differently for each reference tooth position. Each of the centers C5, C6, and C7 of the teeth may be represented by an XYZ coordinate that is a coordinate representing the center of a bounding box surrounding the 3D coordinate values constituting each tooth or by an XZ coordinate with an Y-axis value excluded by projecting the center coordinate onto the XZ plane.

When the angle θ formed by C5, C6, and C7 exceeds a predetermined threshold value, the data processing apparatus 100 may determine that it is necessary to adjust the position of the reference tooth T6 and move the reference tooth T6 along the buccal line. The buccal line may be the same as described with reference to FIG. 11. The data processing apparatus may adjust the position of the center C6 of the reference tooth T6 to be moved along the buccal line and determine a position at which an angle θ formed by C5, C6', and C7 exceeds a predetermined threshold value according to the adjusted position, as an adjustment position of the reference tooth T6 (1300C). For example, when the predetermined threshold value is determined as 130 degrees, the data processing apparatus 100 may determine a position at which the angle θ formed by C5, C6', and C7 becomes 130 degrees while moving the reference tooth T6 along the buccal line, as an adjustment position of the reference tooth T6. As described with reference to FIG. 13, an operation of determining whether to adjust the position of the reference tooth and a position adjustment operation corresponding thereto may be automatically performed by the data processing apparatus 100.

Figure 14:
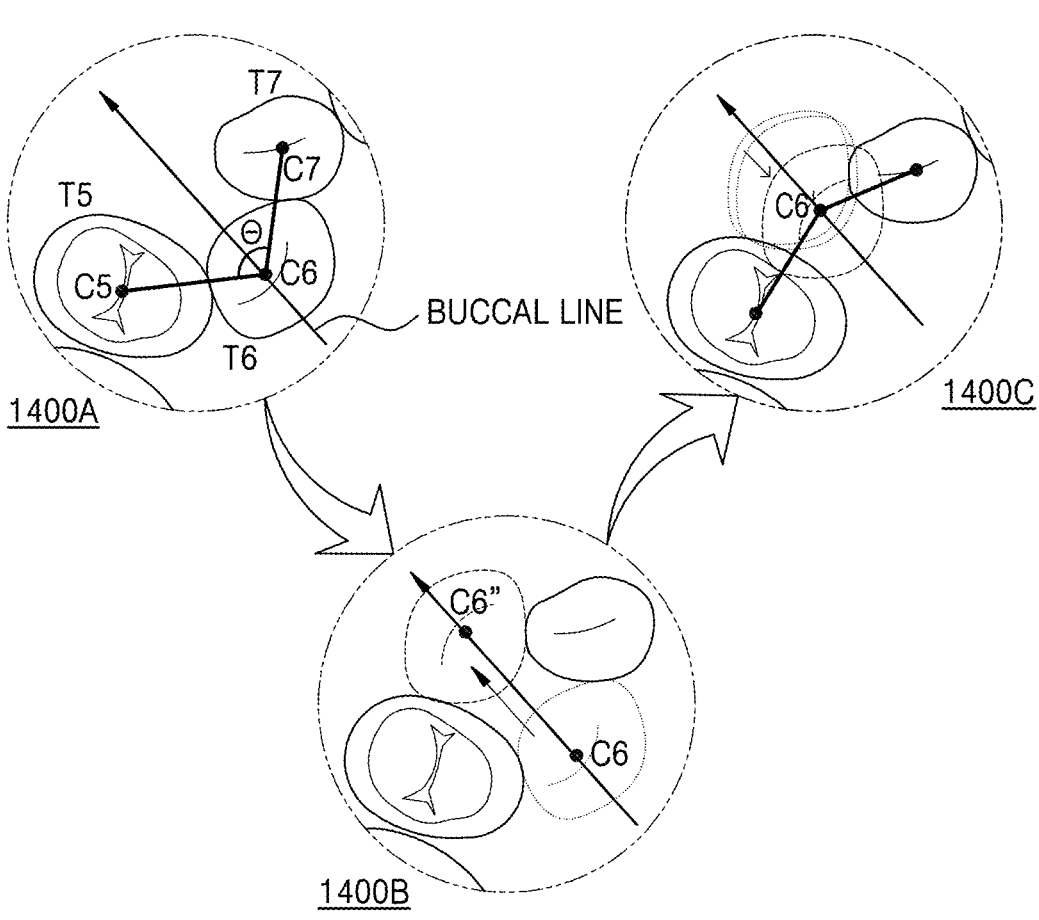
FIG. 14 is a reference diagram for describing another example of a method of adjusting a position of a reference tooth when the position of the reference tooth excessively deviates from a suitable position, according to an embodiment.

FIG. 14 is a reference diagram for describing another example of a method of adjusting a position of a reference tooth when the position of the reference tooth excessively deviates from a suitable position, according to an embodiment.

Referring to FIG. 14, because tooth #6 T6 of the intraoral image has intruded a lot contrary to the example of FIG. 13, when the data processing apparatus 100 generates a customized curve by using T6 as a reference tooth, the generated customized curve may be generated in a considerably distorted form (1400A). Thus, the data processing apparatus 100 may perform an adjustment for moving the reference tooth T6 along the buccal line to adjust the position of the reference tooth T6.

Particularly, first, the data processing apparatus 100 may move the center C6 of the reference tooth T6 to the position of C6" by moving the reference tooth T6 outward along the buccal line (1400B).

As described above with reference to FIG. 13, the data processing apparatus 100 may adjust the position of the reference tooth T6 to be gradually moved inward from C6" along the buccal line and determine a position at which an angle θ formed by C5, C6', and C7 exceeds a predetermined threshold value according to the adjusted position, as an adjustment position of the reference tooth T6 (1400C). For example, when the predetermined threshold value is determined as 130 degrees, the data processing apparatus 100 may determine a position at which the angle θ formed by C5, C6', and C7 becomes 130 degrees while moving the reference tooth T6 along the buccal line, as an adjustment position of the reference tooth T6. As such, when T6 as the reference tooth #6 of the intraoral image has intruded, because a curve based on the teeth of the intraoral image should generally have a convex form, the reference tooth T6 may be moved outward along the buccal line to move C6 to the position of C6" and then it may be gradually moved to C6'. Particularly, it may not be excluded that the curve has a concave form, when a position at which the angle θ formed by C5, C6, and C7 becomes 130 degrees is directly found in the process of moving C6 outward along the buccal line without the process of 1400A to 1400B. For example, when the angle initially formed by C5, C6, and C7 is 100 degrees, in the case of finding a point at which the angle formed by C5, C6, and C7 becomes 130 degrees while moving C6 outward along the buccal line, because the angle becomes 130 degrees but C6 is still inside the centers C5 or C7 of adjacent teeth, the curve formed by C5, C6, and C7 may inevitably have a concave form. Thus, in order to avoid a distortion, when T6 as the reference tooth #6 has intruded, a position satisfying a certain angle may be found by moving the reference tooth T6 outward along the buccal line to move C6 to the position of C6" and then gradually moving the same to C6'.

Alternatively, the data processing apparatus 100 may find the adjustment position while gradually moving the reference tooth T6 outward from the original position C6 along the buccal line, instead of finding the adjustment position by moving the reference tooth T6 outward (C6") and then gradually moving the reference tooth T6 inward along the buccal line. In this case, an additional requirement may be necessary for finding the adjustment position such that the shape of the curve may have a convex form.

According to an embodiment, as for reference teeth in the molar direction, for example, teeth corresponding to tooth number #1 or tooth number #3, among one or more reference teeth used as a reference for generating a customized curve, the data processing apparatus 100 may determine a position distortion of the reference tooth by using a centripetal acceleration (a normal acceleration) and perform a position adjustment according to whether there is a position distortion of the reference tooth.

Figure 15:
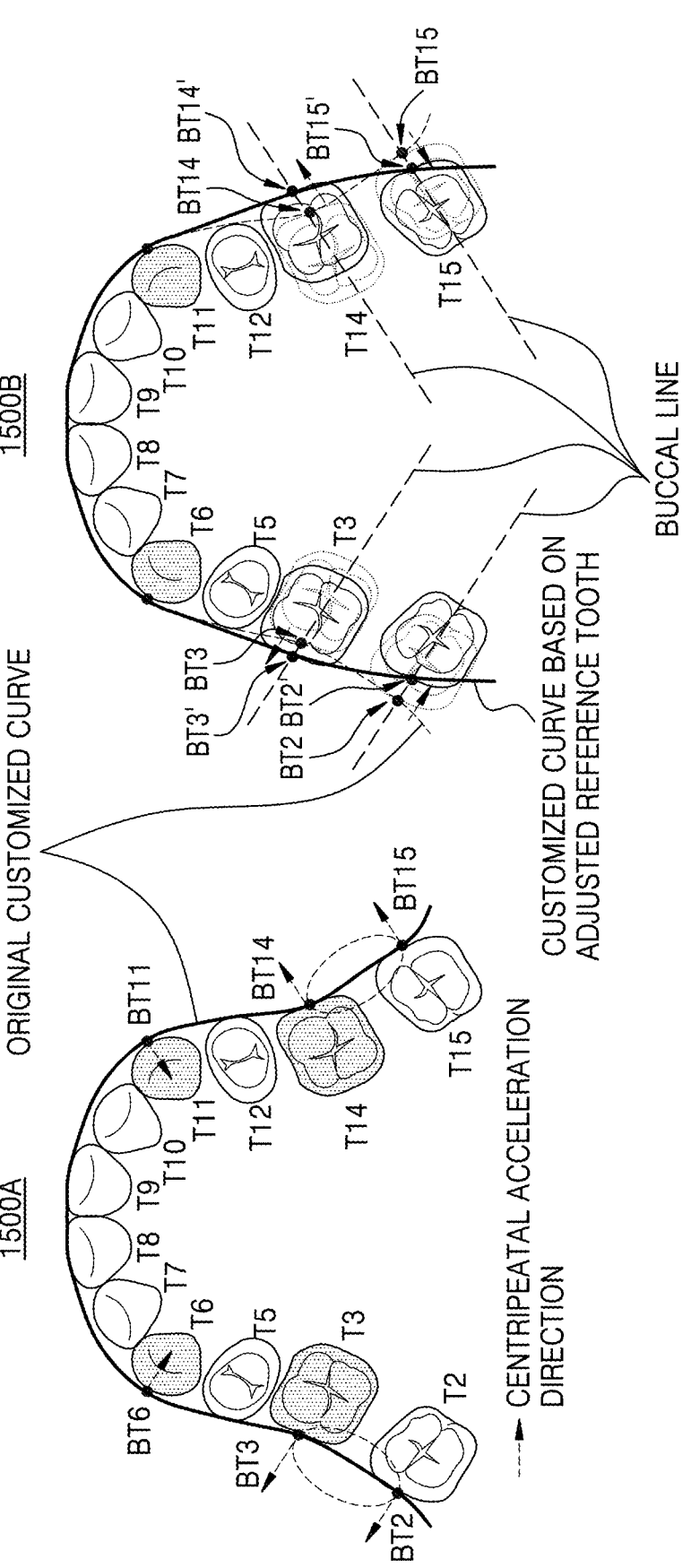
FIG. 15 is a reference diagram for describing a method of determining and adjusting a position distortion of a reference tooth by using a centripetal acceleration, according to an embodiment.

FIG. 15 is a reference diagram for describing a method of determining and adjusting a position distortion of a reference tooth by using a centripetal acceleration, according to an embodiment.

The centripetal acceleration may be an acceleration component in the direction toward the center of curvature of an orbit, may particularly be toward the center of a circle in a uniform circular motion, and may also be referred to as a normal acceleration.

1500A of FIG. 15 illustrates that a customized curve is generated based on one or more reference teeth of the intraoral image, for example, T2, T3, T6, T11, T14, and T15. As for the centripetal acceleration at points (BT2, BT3, BT6, BT11, BT14, and BT15) through which the customized curve passes the reference tooth, the centripetal acceleration may be toward the inside of the oral cavity in BT6 or BT11 but may be toward the outside of the oral cavity in BT2, BT3, BT14, and BT15. The fact that the centripetal acceleration is toward the outside of the oral cavity may mean that the customized curve has a concave form and may need to be adjusted to have a convex form in order to obtain a natural curve.

1500B of FIG. 15 illustrates that the position of reference teeth with a centripetal acceleration toward the outside of the oral cavity is adjusted. The data processing apparatus 100 may move the positions of the reference teeth with a centripetal acceleration toward the outside of the oral cavity such that the condition of the centripetal acceleration being toward the inside of the oral cavity may be satisfied. Particularly, the data processing apparatus 100 may move BT2 of the reference tooth T2 to the inside of the oral cavity along the buccal line and move BT3 of the reference tooth T3 to the outside of the oral cavity along the buccal line. As such, the positions satisfying the condition of the centripetal acceleration being toward the inside of the oral cavity while moving the reference teeth T2 and T3 in opposite directions along the buccal line, that is, the position at which BT2 of T2 has moved to BT2' and the position at which BT3 of T3 has moved to BT3', may be respectively determined as the adjustment positions of the reference teeth T2 and T3. The same operation may be performed on the reference teeth T14 and T15. After performing the position adjustment of the reference teeth as such, the data processing apparatus may obtain a customized curve passing through BT2', BT3', BT6, BT11, BT14', and BT15' according to the adjusted positions of the reference teeth.

According to an embodiment, by considering the position in the XZ plane, the data processing apparatus 100 may perform a position adjustment on front teeth, for example, teeth corresponding to tooth number #8 or tooth number #9, among one or more reference teeth used as a reference for generating a customized curve.

Figure 16:
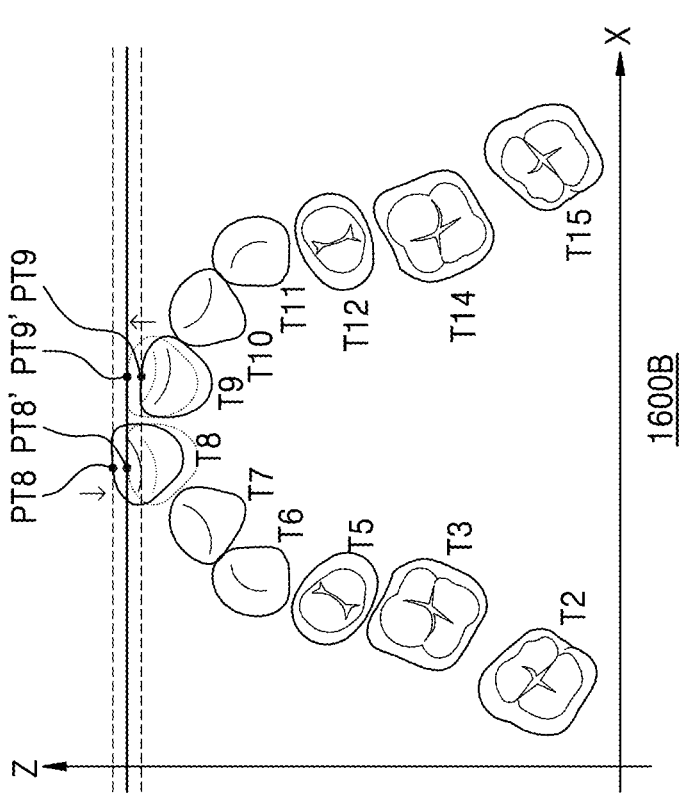
FIG. 16 is a reference diagram for describing a method of adjusting a position of a front tooth as a reference tooth, according to an embodiment.
Figure 16:
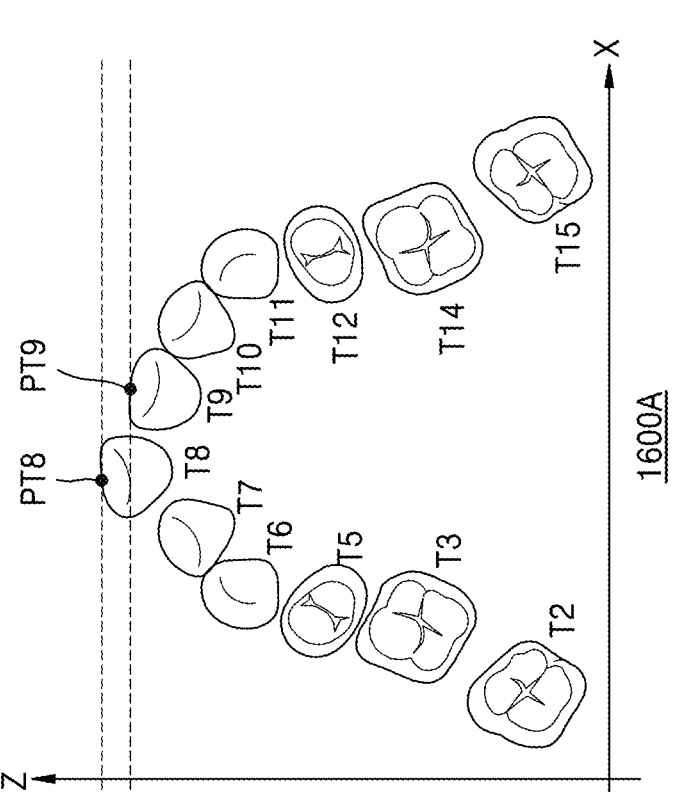

FIG. 16 is a reference diagram for describing a method of adjusting a position of a front tooth as a reference tooth, according to an embodiment.

Referring to 1600A of FIG. 16, as for the XZ coordinates obtained by projecting the 3D coordinates of the teeth of the intraoral image onto the XZ plane, it may be seen that there is a difference between the Z coordinate values of the tooth T8 of tooth number #8 and the tooth T9 of tooth number #9 that are reference teeth corresponding to the front teeth. As such, the difference between the Z coordinate values of two front teeth may indicate that one of two front teeth of the patient protrudes more, and in this case, when such front teeth are used as reference teeth, the shape of the curve may be distorted.

Thus, referring to 1600B of FIG. 16, the data processing apparatus 100 may perform a position adjustment for matching the Z coordinate values of two front teeth. Particularly, the data processing apparatus may move two front teeth T8 and T9 such that the greatest Z coordinate value of two front teeth T8 and T9 may be the average value (AVG) of the greatest Z coordinate value in T8 and the greatest Z coordinate value in T9. For this purpose, the data processing apparatus may move the front teeth to the position at which the Z coordinate values of T8 and T9 become equal to each other, by moving the point PT8 having the greatest Z coordinate value in T8 to PT8' at which the Z coordinate value thereof becomes the average value (AVG) and moving the point PT9 having the greatest Z coordinate value in T9 to PT9' at which the Z coordinate value thereof becomes the average value (AVG). As such, a more natural and even curve may be obtained by horizontally adjusting the position of two front teeth used as reference teeth among the teeth in the oral cavity and generating a customized curve based on the front teeth having the horizontally adjusted position.

As described above, according to an embodiment, the data processing apparatus 100 may determine one or more reference teeth from the intraoral image of the patient and generate a customized curve of the patient based on the determined one or more reference teeth. In this case, it may be determined whether the position of one or more reference teeth included in the intraoral image of the patient has been excessively distorted, and when it is determined that the position of one or more reference teeth has been distorted, the data processing apparatus 100 may adjust the position of one or more reference teeth and generate a customized curve based on the adjusted positions of the reference teeth. The customized curve based on the patient's intraoral image may be applied to any one of the patient's upper-jaw intraoral image and the patient's lower-jaw intraoral image.

According to another embodiment, the data processing apparatus 100 may apply the generation of the customized curve based on the patient's intraoral image to the patient's upper-jaw intraoral image as described above and may generate a customized curve for the patient's lower jaw based on the upper-jaw customized curve. An example of a method of generating a lower-jaw customized curve based on an upper-jaw customized curve according to an embodiment will be described with reference to FIGS. 17 to 20.

Figure 17:
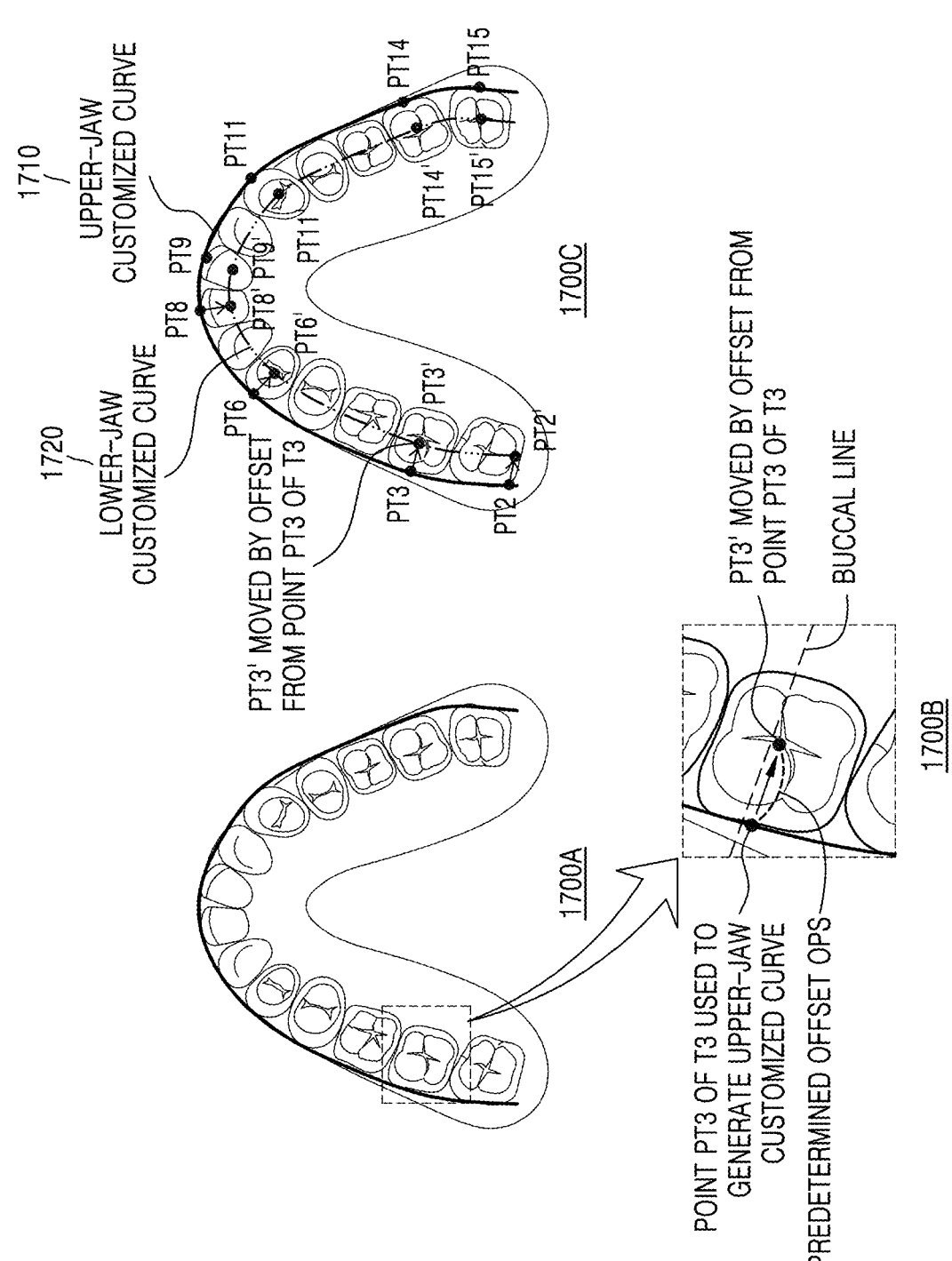
FIG. 17 is a reference diagram for describing a method of generating a lower-jaw customized curve based on an upper-jaw customized curve of the patient, according to an embodiment.

FIG. 17 is a reference diagram for describing a method of generating a lower-jaw customized curve based on an upper-jaw customized curve of the patient, according to an embodiment.

Referring to FIG. 17, the data processing apparatus 100 may generate an upper-jaw customized curve based on one or more reference teeth of the patient's upper-jaw intraoral image. In this case, when the position of one or more reference teeth in the upper-jaw intraoral image is excessively distorted, the positions of the reference teeth may be adjusted and then an upper-jaw customized curve may be generated based on the adjusted reference teeth (1700A). Because an important point to be considered in generating the lower-jaw customized curve is that the occlusion of the lower-jaw teeth and the lower-jaw teeth should be well matched, a lower-jaw customized curve may be generated based on the lower-jaw customized curve.

According to an embodiment, the data processing apparatus 100 may generate a lower-jaw customized curve by reflecting an offset of a predetermined amount on the upper-jaw customized curve. Particularly, the data processing apparatus 100 may move the points of one or more reference teeth used as a basis for generating the lower-jaw customized curve by a predetermined distance (offset) along the buccal line and generate a curve based on the moved points, thereby obtaining a lower-jaw customized curve. Referring to 1700B of FIG. 17, a point PT3' at a position obtained by moving a point PT3 on the reference tooth T3 used to generate an upper-jaw customized curve 1710 by a predetermined offset along the buccal line may be used to generate a lower-jaw customized curve 1720. In this way, also for other reference teeth, new points PT2', PT3', PT6', PT8', PT9', PT11', PT14', and PT15' may be obtained by moving the points PT2, PT3, PT6, PT8, PT9, PT11, PT14, and PT15 by a predetermined offset, and a lower-jaw customized curve may be obtained by generating a curve passing through the obtained points PT2', PT3', PT6', PT8', PT9', PT11', PT14', and PT15' (1700C).

According to an embodiment, the data processing apparatus 100 may determine a predetermined offset OPS as a distance for allowing the position of an outer cusp of the lower-jaw teeth may be arranged at a groove of the upper-jaw teeth.

Figure 18:
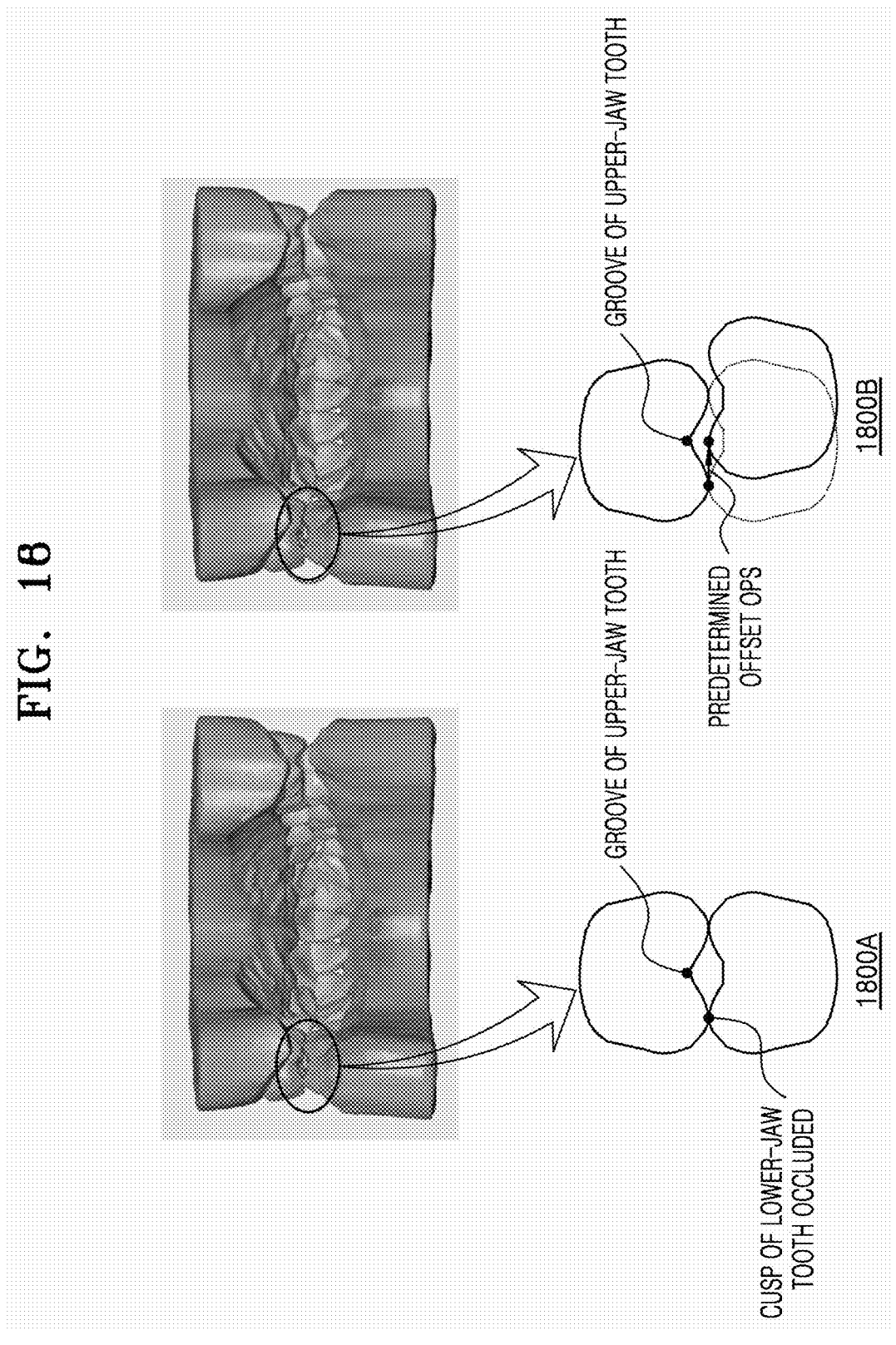
FIG. 18 is a reference diagram for describing a method of determining an amount of a predetermined offset OPS, according to an embodiment.

FIG. 18 is a reference diagram for describing a method of determining an amount of a predetermined offset OPS, according to an embodiment.

Referring to FIG. 18, when the groove of the upper-jaw tooth and the outer cusp of the lower-jaw tooth occluded with the upper-jaw tooth are arranged as in 1800A, because the chewing function may be degraded due to incorrect occlusion of the upper-jaw tooth and the lower-jaw tooth, it may be desirable for occlusion that the outer cusp of the lower-jaw tooth is arranged at a position corresponding to the groove of the upper-jaw tooth as in 1800B. Thus, the data processing apparatus 100 may determine a movement amount for allow the outer cusp of the lower-jaw tooth to be occluded with the groove of the upper-jaw tooth, as a predetermined offset OPS used to generate a lower-jaw customized curve.

According to an embodiment, the data processing apparatus 100 may set a different value for each reference tooth as a predetermined offset OPS used to generate a lower-jaw customized curve. In the example described with reference to FIG. 18, the same offset (OPS) size is used for each reference tooth to derive a lower-jaw customized curve from the upper-jaw customized curve; however, a different offset size may be used for each reference tooth.

Figure 19:
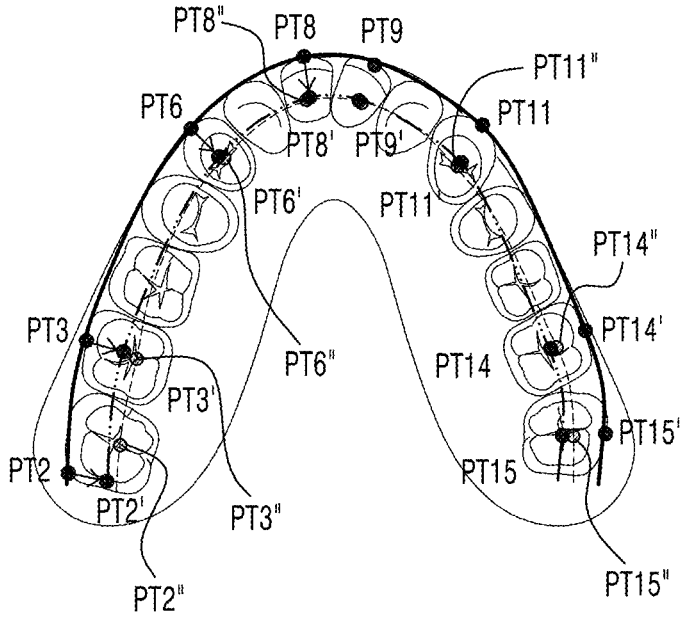
FIG. 19 is a reference diagram for describing a method of determining an amount of a predetermined offset OPS differently for each reference tooth, according to an embodiment.

FIG. 19 is a reference diagram for describing a method of determining an amount of a predetermined offset OPS differently for each reference tooth, according to an embodiment.

As described above, the amount of the predetermined offset may be determined such that the cusp of the lower-jaw tooth may be occluded with the groove of the upper-jaw tooth; however, the amount of the offset for the occlusion may be different for each reference tooth.

Referring to FIG. 19, a lower-jaw customized curve 1900 more suitable for the patient's oral state may be obtained when the lower-jaw customized curve 1900 is generated based on positions PT2″, PT3″, PT6″, PT8″, PT9″, PT11″, PT14″, and PT15″ of the grooves of the corresponding teeth with respect to the reference teeth T2, T3, T6, T8, T9, T11, T14, and T15, such as PT2″ for the position of the groove of the upper-jaw tooth with respect to the reference tooth T2 and PT3″ for the position of the groove of the upper-jaw tooth with respect to the reference tooth T3.

Figure 20:
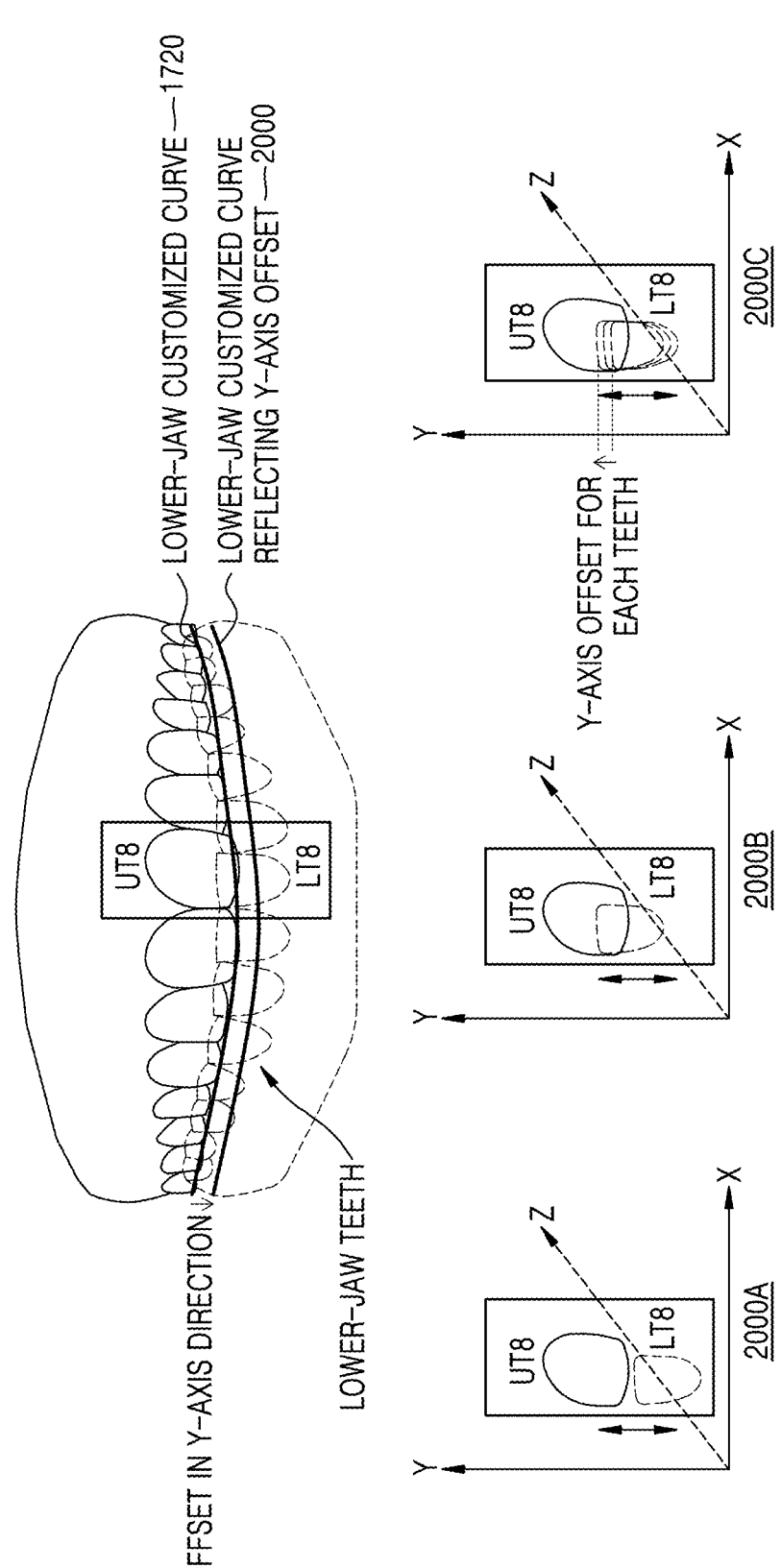
FIG. 20 is a reference diagram for describing a method of generating a final lower-jaw customized curve by moving a lower-jaw customized curve generated based on the patient's upper-jaw customized curve by an offset in the Y-axis direction, according to an embodiment.

FIG. 20 is a reference diagram for describing a method of generating a final lower-jaw customized curve by moving a lower-jaw customized curve generated based on the patient's upper-jaw customized curve by an offset in the Y-axis direction, according to an embodiment.

The offset described in FIG. 17 is set by considering an offset on the XZ plane, and a final lower-jaw customized curve may be obtained by moving the lower-jaw customized curve obtained in FIG. 17 by further considering an offset in the Y-axis direction.

According to an embodiment, the data processing apparatus 100 may obtain a final lower-jaw customized curve 2000 by moving the lower-jaw customized curve 1720 obtained in FIG. 17 by a predetermined offset in the Y-axis direction.

According to an embodiment, the data processing apparatus 100 may align the lower-jaw teeth included in the patient's lower-jaw intraoral image with the final lower-jaw customized curve 2000 obtained by moving the lower-jaw customized curve by a predetermined uniform offset in the Y-axis direction. In this case, the data processing apparatus 100 may adjust the position of the lower-jaw teeth to be naturally occluded with the upper-jaw teeth, by an operation of moving one or more of the lower-jaw teeth aligned with the lower-jaw customized curve 2000 in the Y-axis direction automatically by an algorithm therein or according to a user input. For example, particularly, as for an upper-jaw tooth UT8 and a lower-jaw tooth LT8 in FIG. 20, the lower-jaw tooth LT8 aligned with the lower-jaw customized curve reflecting an uniform offset in the Y-axis direction may be too spaced apart from (2000A) or may too overlap with (2000B) the upper-jaw tooth UT8 occluded with the lower-jaw tooth LT8, thus resulting in incorrect occlusion therebetween. Thus, the data processing apparatus 100 may move the lower-jaw tooth LT8 in the Y-axis direction automatically by the algorithm therein or through an user operation, determine a position at which the lower-jaw tooth LT8 is naturally occluded with the lower-jaw tooth UT8, and determine the position of the lower-jaw tooth LT8 by moving the LT8 to the determined position. For example, the data processing apparatus 100 may move the lower-jaw tooth LT8 in the Y-axis direction and determine a position at which the lower-jaw tooth LT8 meets the upper-jaw tooth UT8 at least one point, as the position of the lower-jaw tooth LT8 (2000C).

Figure 21:
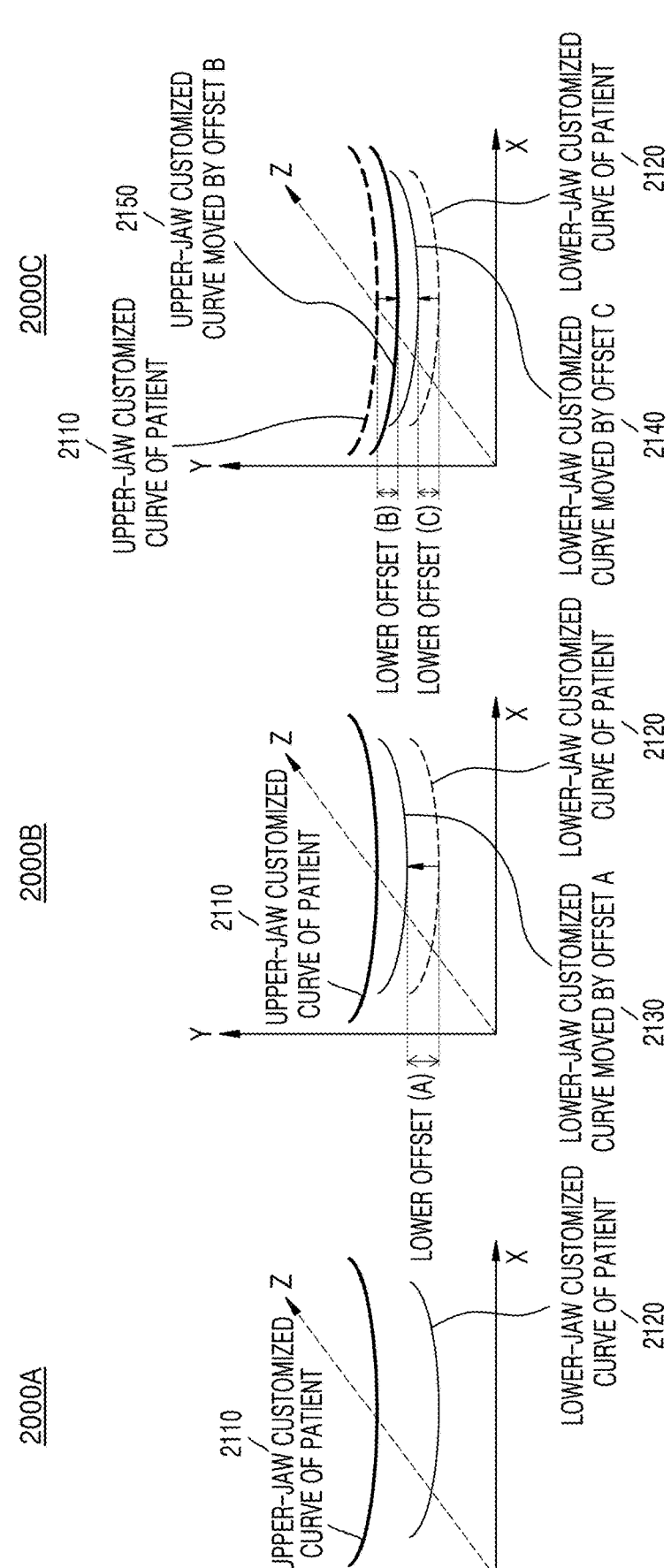
FIG. 21 is a reference diagram for describing a method of generating a final upper-jaw customized curve and a final lower-jaw customized curve by respectively moving an upper-jaw customized curve and a lower-jaw customized curve of the patient by offsets in the Y-axis direction, according to an embodiment.

FIG. 21 is a reference diagram for describing a method of generating a final upper-jaw customized curve and a final lower-jaw customized curve by respectively moving an upper-jaw customized curve and a lower-jaw customized curve of the patient by offsets in the Y-axis direction, according to an embodiment.

According to an embodiment, the lower-jaw customized curve may be generated according to an offset on the XZ plane and/or an offset in the Y-axis direction and then the overall position of the upper-jaw jaw customized curve and the lower-jaw customized curve may be adjusted.

2100A of FIG. 21 illustrates an upper-jaw customized curve 2110 of the patient and a lower-jaw customized curve 2120 of the patient generated by moving the curve by an offset based on the upper-jaw customized curve of the patient.

2100B of FIG. 21 illustrates an example of generating a final lower-jaw customized curve 2130 by adding a Y-axis offset (A) to the lower-jaw customized curve in a state where the upper-jaw customized curve 2110 is fixed as described with reference to FIG. 20. As such, when the final customized curve 2130 is generated by giving an offset (A) to the lower-jaw customized curve 2120 in a state where the upper-jaw customized curve 2110 is fixed, the lower jaw may move significantly in the actual orthodontic process. In order to prevent this limitation, the movement amount of only the lower jaw may be prevented from increasing, by distributing the actual movement amount of the upper jaw and the lower jaw in the orthodontic process by moving both the upper-jaw customized curve and the lower-jaw customized curve little by little while maintaining the total offset amount.

2100C of FIG. 21 illustrates that a final upper-jaw customized curve 2150 is generated by reflecting an offset B on the upper-jaw customized curve 2110 and a final lower-jaw customized curve 2140 is generated by reflecting an offset C on the lower-jaw customized curve 2120. In this case, the offset A may be equal to the sum of the offset B and the offset C. As such, the actual movement amount of the upper jaw and the lower jaw may be reduced in the orthodontic process by performing an adjustment for slightly lowering the upper-jaw customized curve and slightly raising the lower-jaw customized curve.

The intraoral image processing method according to an embodiment of the present disclosure may be embodied in the form of program commands executable through various computer means, which may be recorded on a computer-readable recording medium. Also, embodiments of the present disclosure may include a computer-readable storage medium having recorded therein one or more programs including at least one instruction for executing the intraoral image processing method.

The computer-readable storage medium may include program commands, data files, and data structures either alone or in combination. Examples of the computer-readable storage medium may include magnetic media such as hard disks, floppy disks, or magnetic tapes, optical media such as CD-ROMs or DVDs, and magneto-optical media such as floptical disks, and hardware devices such ROMs, RAMs, or flash memories configured to store and execute program commands.

Here, a machine-readable storage medium may be provided in the form of a non-transitory storage medium. Here, the "non-transitory storage medium" may mean that the storage medium is a tangible device. Also, the "non-transitory storage medium" may include a buffer in which data is temporarily stored.

According to an embodiment of the present disclosure, the method according to various embodiments of the present disclosure may be included and provided in a computer program product. The computer program product may be distributed in the form of a machine-readable storage medium (e.g., a compact disc read only memory (CD-ROM)). Alternatively, the computer program product may be distributed (e.g., downloaded or uploaded) online through an application store (e.g., Play Store) or directly between two user devices (e.g., smartphones). Particularly, the computer program product according to embodiments may include a storage medium having recorded therein a program including at least one instruction to perform the intraoral image processing method according to embodiments.

Although embodiments have been described above in detail, the scope of the present disclosure is not limited thereto and various modifications and improvements made by those of ordinary skill in the art by using the basic concept of the present disclosure defined in the following claims are also included in the scope of the present disclosure.

The invention claimed is:

1. A method of processing an intraoral image, the method comprising:

obtaining an intraoral image generated by scanning teeth;

segmenting teeth of the intraoral image;

determining a predefined number of reference teeth from among the teeth included in the intraoral image based on predetermined criteria;

determining whether to adjust the position of at least one reference tooth, and adjusting the position of the at least one reference tooth, which is determined to be adjusted;

generating a customized curve based on the reference teeth including the at least one reference tooth whose position is adjusted, by moving the position of the reference tooth such that an angle formed between the reference tooth and teeth adjacent to the reference tooth is equal to or greater than a certain angle; and obtaining a final position of teeth by arranging teeth segmented from the intraoral image to be aligned with the customized curve.

2. The method of claim 1, wherein the segmenting of the teeth of the intraoral image comprises separating the teeth of the intraoral image by using information of teeth included in tooth model data, and obtaining at least one piece of shape information, position information, and number information of each of the separated teeth.

3. The method of claim 1, further comprising generating the customized curve based on the features of the reference teeth including at least one of an outermost point, an uppermost point, or a buccal point of the reference teeth.

4. The method of claim 1, wherein the adjusting of the positions of the at least one reference tooth among the reference teeth comprises, when the customized curve generated based on the reference teeth has a concave portion, moving the positions of the reference teeth corresponding to the concave portion.

5. The method of claim 1, wherein the adjusting of the positions of the at least one reference tooth among the reference teeth comprises moving a position of two front teeth such that two teeth corresponding to front teeth among the reference teeth are located in parallel.

6. The method of claim 1, wherein the obtaining of the final position of the teeth by arranging the teeth segmented from the intraoral image to be aligned with the customized curve comprises:

aligning the teeth segmented from the intraoral image based on tooth model data; and moving the teeth aligned based on the tooth model data to be aligned with the customized curve.

7. The method of claim 6, wherein the aligning of the teeth segmented from the intraoral image based on the tooth model data comprises rotating the teeth segmented from the intraoral image with reference to directions of teeth of the tooth model data.

8. The method of claim 1, wherein the customized curve includes an upper-jaw customized curve, the method further comprising:

generating a lower-jaw customized curve by moving the upper-jaw customized curve by a predetermined distance; and arranging the teeth segmented from the intraoral image to be aligned with the upper-jaw customized curve and the lower-jaw customized curve.

9. The method of claim 8, further comprising adjusting positions of the upper-jaw customized curve and the lower-jaw customized curve by moving at least one of the upper-jaw customized curve and the lower-jaw customized curve by a certain offset in a Y-axis direction.

10. An apparatus for processing an intraoral image, the apparatus comprising:

a memory; and a processor configured to execute one or more instructions stored in the memory to obtain an intraoral image generated by scanning teeth, segment teeth of the intraoral image, determine a predefined number of reference teeth from among the teeth included in the intraoral image based on predetermined criteria, determine whether to adjust the position of at least one reference tooth, and adjust the position of the at least one reference tooth, which is determined to be adjusted, by moving the position of the reference tooth such that an angle formed between the reference tooth and teeth adjacent to the reference tooth is equal to or greater than a certain angle, generate a customized curve based on the reference teeth including the at least one reference tooth whose position is adjusted, and obtain a final position of teeth by arranging teeth segmented from the intraoral image to be aligned with the customized curve.

11. The apparatus of claim 10, wherein the processor is configured to execute one or more instructions stored in the memory to, in order to segment the teeth of the intraoral image, separate the teeth of the intraoral image by using information of teeth included in tooth model data, and obtain at least one piece of shape information, position information, and number information of each of the separated teeth.

12. The apparatus of claim 10, wherein the processor is configured to execute one or more instructions stored in the memory to, in order to adjust the positions of the at least one reference tooth among the reference teeth, when the customized curve generated based on the reference teeth has a concave portion, move the positions of the reference teeth corresponding to the concave portion.

13. The apparatus of claim 10, wherein the processor is configured to execute one or more instructions stored in the memory to, in order to obtain the final positions of the teeth by arranging the teeth segmented from the intraoral image to be aligned with the customized curve, align the teeth segmented from the intraoral image based on tooth model data, and obtain the final positions of the teeth by moving the teeth aligned based on the tooth model data to be aligned with the customized curve.

14. A non-transitory computer-readable recording medium having recorded thereon a program including at least one instruction for performing an intraoral image processing method by a computer, the intraoral image processing method comprising:

obtaining an intraoral image generated by scanning teeth;

segmenting teeth of the intraoral image;

determining a predefined number of reference teeth from among the teeth included in the intraoral image based on predetermined criteria;

determining whether to adjust the position of at least one reference tooth, and adjusting the position of the at least one reference tooth, which is determined to be adjusted, by moving the position of the reference tooth such that an angle formed between the reference tooth and teeth adjacent to the reference tooth is equal to or greater than a certain angle;

generating a customized curve based on the reference teeth including the at least one reference tooth whose position is adjusted; and obtaining a final position of teeth by arranging teeth segmented from the intraoral image to be aligned with the customized curve.

\*  \*  \*  \*  \*